US008279166B2

(12) United States Patent
Huitema et al.

(10) Patent No.: US 8,279,166 B2
(45) Date of Patent: Oct. 2, 2012

(54) DISPLAY APPARATUS COMPRISING ELECTROFLUIDIC CELLS

(75) Inventors: Hjalmar Edzer Ayco Huitema, Veldhoven (NL); Jason Charles Heikenfeld, Cincinnati, OH (US)

(73) Assignees: Creator Technology B.V., Breda (NL); University of Cincinnati, Cincinnati, OH (US)

( * ) Notice: Subject to any disclaimer, the term of this patent is extended or adjusted under 35 U.S.C. 154(b) by 183 days.

(21) Appl. No.: 12/723,330

(22) Filed: Mar. 12, 2010

(65) Prior Publication Data

US 2011/0025668 A1 Feb. 3, 2011

Related U.S. Application Data

(60) Provisional application No. 61/159,673, filed on Mar. 12, 2009.

(51) Int. Cl.

| | |
|---|---|
| ***G09G 3/34*** | (2006.01) |
| ***G06F 3/038*** | (2006.01) |
| ***G09G 5/00*** | (2006.01) |
| ***G02B 26/00*** | (2006.01) |

(52) U.S. Cl. ........ 345/107; 345/211; 345/214; 345/215; 359/290; 359/296

(58) Field of Classification Search .......... 345/105–107; 359/296

See application file for complete search history.

(56) References Cited

U.S. PATENT DOCUMENTS

| | | | | |
|---|---|---|---|---|
| 2006/0164350 | A1 * | 7/2006 | Kim et al. | 345/87 |
| 2007/0211330 | A1 * | 9/2007 | Ohshima et al. | 359/296 |
| 2008/0055222 | A1 * | 3/2008 | Chen et al. | 345/90 |
| 2008/0079710 | A1 * | 4/2008 | Ishii | 345/215 |
| 2010/0208328 | A1 * | 8/2010 | Heikenfeld et al. | 359/290 |

FOREIGN PATENT DOCUMENTS

EP 1 967 888 A2 9/2008

OTHER PUBLICATIONS

Haikenfeld et al., "*Recent Progress in Arrayed Electrowetting Optics*" Optics and Photonic News, vol. 20, No. 1 , Jan. 1, 2009.
International Search Report for PCT/NL2010/050130 dated Jul. 1, 2010.

* cited by examiner

*Primary Examiner* — Bipin Shalwala
*Assistant Examiner* — Ryan A Lubit

(57) ABSTRACT

A display apparatus is described comprising a plurality of electrofluidic chromatophore (EFC) pixel cells. Each pixel cell comprises a fluid holder for holding a polar fluid and a non-polar fluid having differing display properties. The fluid holder comprises a fluid reservoir with a geometry having a small visible area onto the polar fluid, and a channel with a geometry having a large visible area onto the polar fluid. The channel is connected to the reservoir to enable free movement of the polar fluid and non-polar fluid between the channel and the reservoir. At least part of a surface of the channel comprises a wetting property responsive to a supply voltage. The pixel cell comprises at least one further pixel cell terminal that is coupled to a further electrode to supply a direct voltage to the pixel cell.

19 Claims, 21 Drawing Sheets

Figure 2
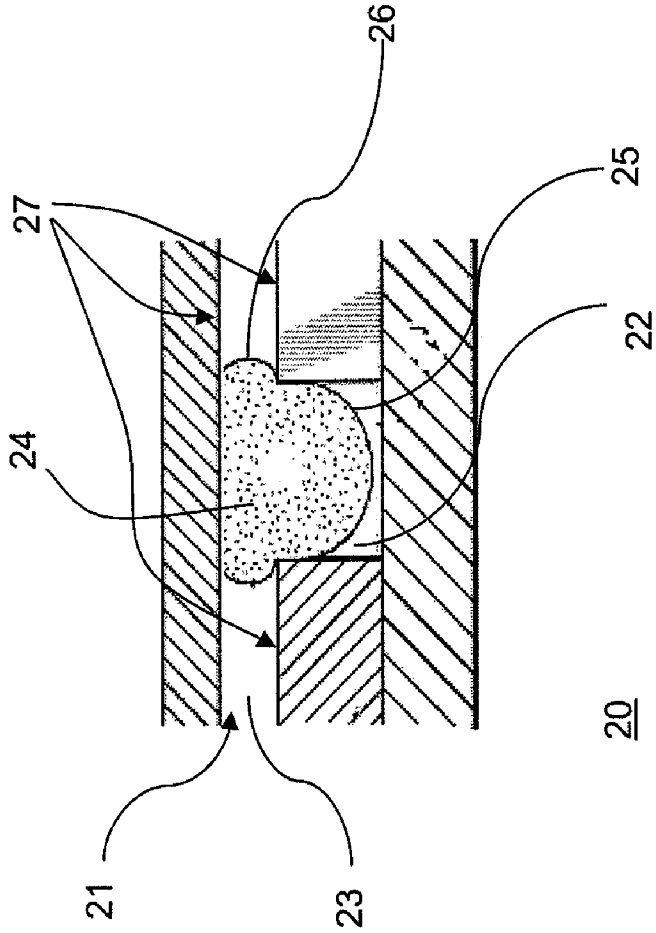
Figure 2A
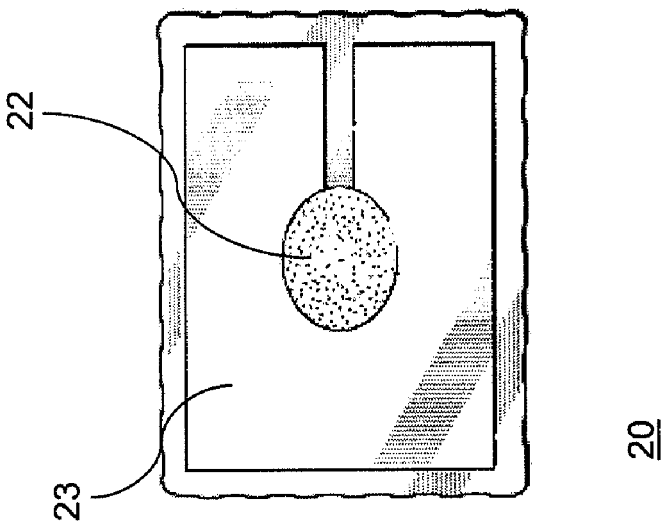
Figure 2B

Figure 6: water directly connected

Figure 10: Pixel schematics with Cst
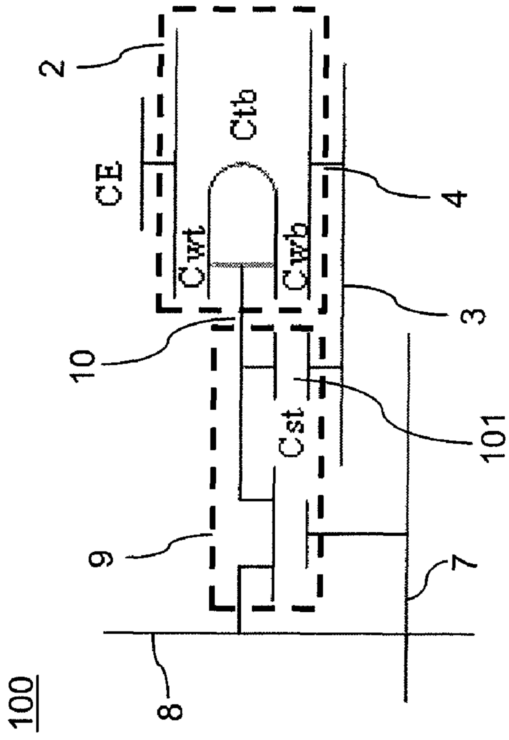
Figure 10A: bottom directly connected + Cst
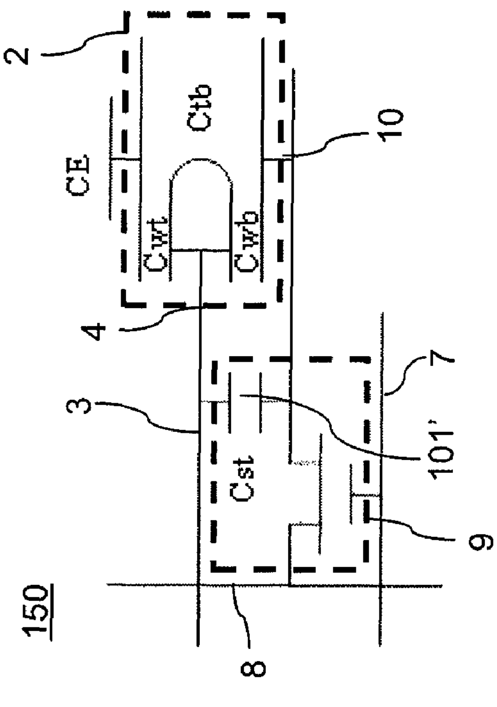
Figure 10B: water directly connected + Cst

Figure 14B: separate to black and to white circuits
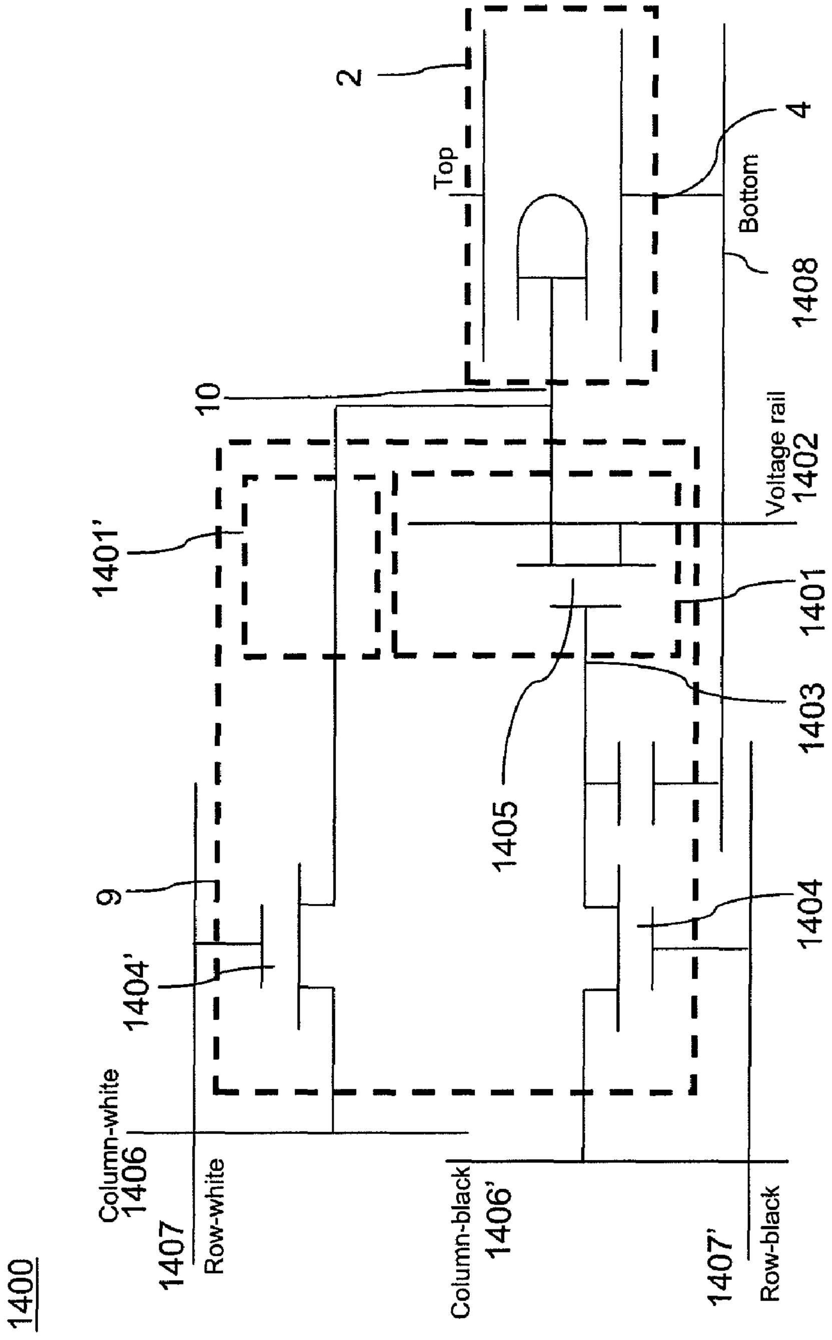

1600

Figure 17: bi-stable pixel cell
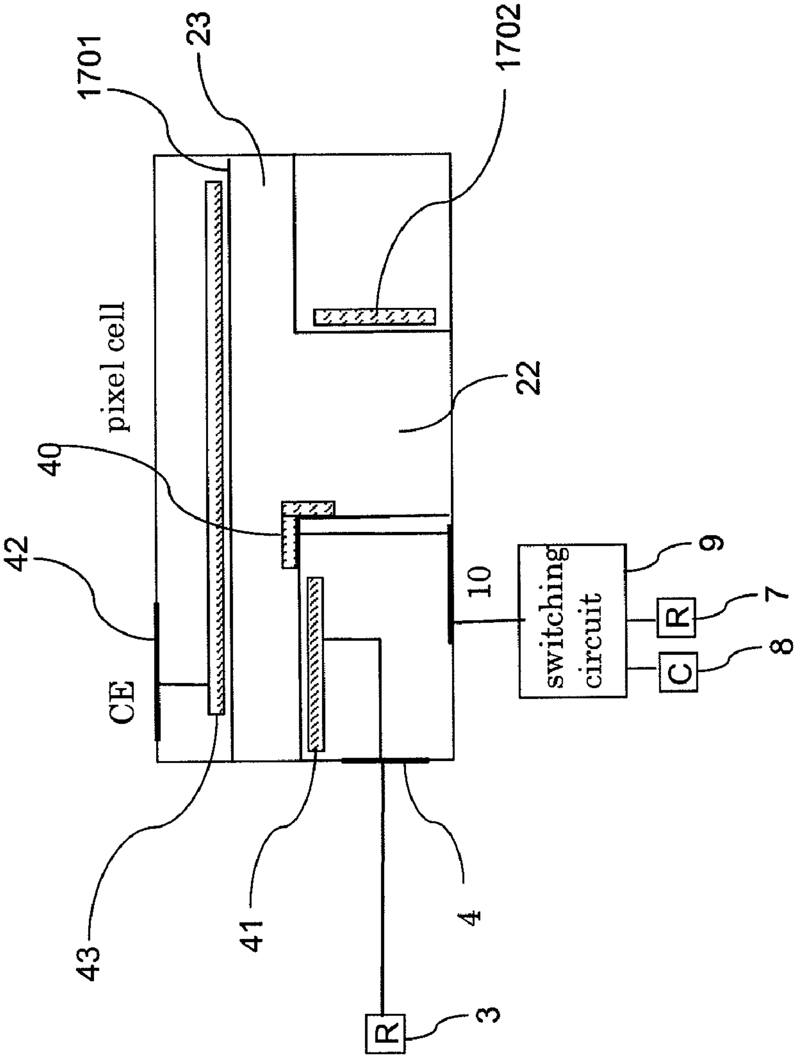
1700

1800

Figure 18B: Pixel circuit for bi-stable operation
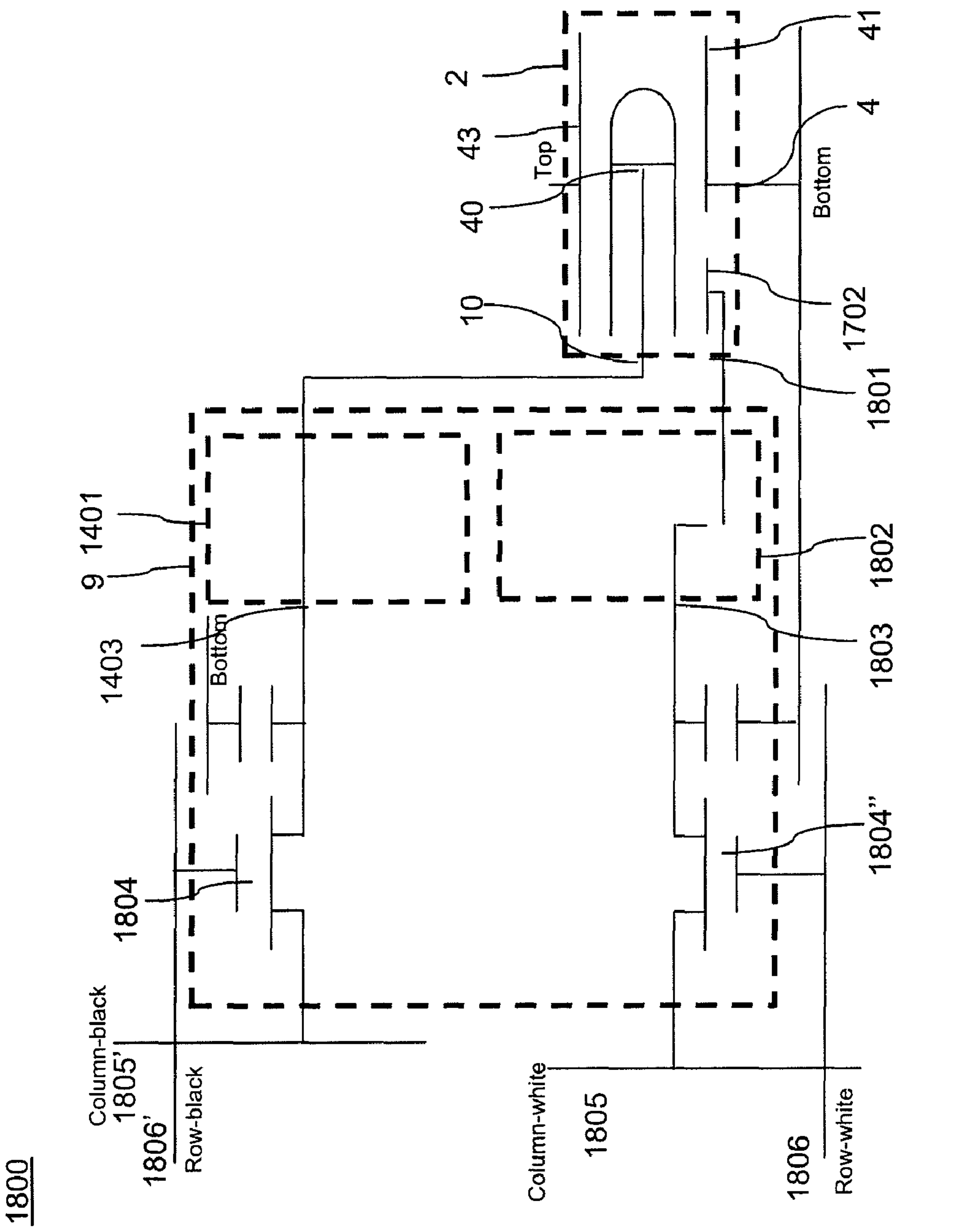

DISPLAY APPARATUS COMPRISING ELECTROFLUIDIC CELLS

CROSS-REFERENCE TO RELATED APPLICATION

This application claims the priority benefit of Huitema et al., U.S. Provisional Patent Application Ser. No. 61/159,673, filed on Mar. 12, 2009, and entitled "Display Apparatus Comprising Electrofluidic Cells," the contents of which referenced provisional patent application are incorporated herein by reference in their entirety, including any references therein.

TECHNOLOGY FIELD

The invention relates to the field of displays, in particular, displays comprising electrofluidic cells.

BACKGROUND OF THE INVENTION

Up to now, in certain areas of display technology, in particular, flexible displays, an electrophoretic electro-optical medium is commonly used.

However, the electrophoretic electro-optical medium is subject to a number of restrictions. The medium has a relatively slow pixel response that makes video display challenging and has a relatively low brightness compared to paper.

Displays based on the electrowetting electro-optical medium may remedy at least some of the restrictions mentioned above. A particular variant using this principle is e.g. described in publication WO2004068208. This variant has a height dimension that is relatively large compared to liquid crystal or electrophoretic displays which hinders the use in flexible displays.

SUMMARY OF THE INVENTION

It is an object of the present invention to provide an improved, electrowetting based display.

According to an aspect, there is provided a display apparatus, the apparatus comprising a plurality of electrofluidic chromatophore (EFC) pixel cells, each pixel cell comprising a fluid holder for holding a polar fluid and a non-polar fluid having differing display properties, the fluid holder comprising a fluid reservoir with a geometry having a small visible area onto the polar fluid, and a channel with a geometry having a large visible area onto the polar fluid, the channel being connected to the reservoir so as to enable free movement of the polar fluid and non-polar fluid between the channel and the reservoir, at least part of a surface of the channel comprising a wetting property responsive to a supply voltage, at least two pixel cell terminals being arranged to provide the supply voltage to the at least part of the surface of the channel comprising the wetting property;

a backplane (circuit board), the backplane comprising a plurality of switching circuits for supplying a switched voltage to pixel cells, the switching circuit being connected to at least one of the pixel cell terminals, a plurality of row and column electrodes, the row and column electrodes being pairwise coupled to the switching circuit; and a driver being configured to charge the row and column electrodes and activate the switching circuits to address the switched voltage to the pixel cell, so as to generate the supply voltage resulting in a movement of the polar fluid to change a cell display property;

and the pixel cell comprises at least one further pixel cell terminal, also referred to as direct voltage terminal, that is coupled to a further electrode to supply a direct voltage to the pixel cell, and wherein the driver is further configured to additionally charge the further electrode, so as to bring the pixel cell into an intermediate condition.

The display has, due to a reduced height dimension, a geometry suitable for use in flexible displays, and can, due to the direct voltage supply to the pixel cell, be driven in a realistic voltage operating range.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 2A-B: are a schematic representation of the electrofluidic pixel cell according to the present invention;

FIGS. 10A-B: are pixel schematics with storage capacitor;

FIGS. 14A-B: depict exemplary separate to black and to white circuits;

FIG. 17: depicts a bi-stable configuration of the display apparatus according to the present invention;

FIGS. 18A-B: depict a pixel circuit for bi-stable operation; and

DETAILED DESCRIPTION OF THE EMBODIMENTS

Figures 1, 1A, 1B:
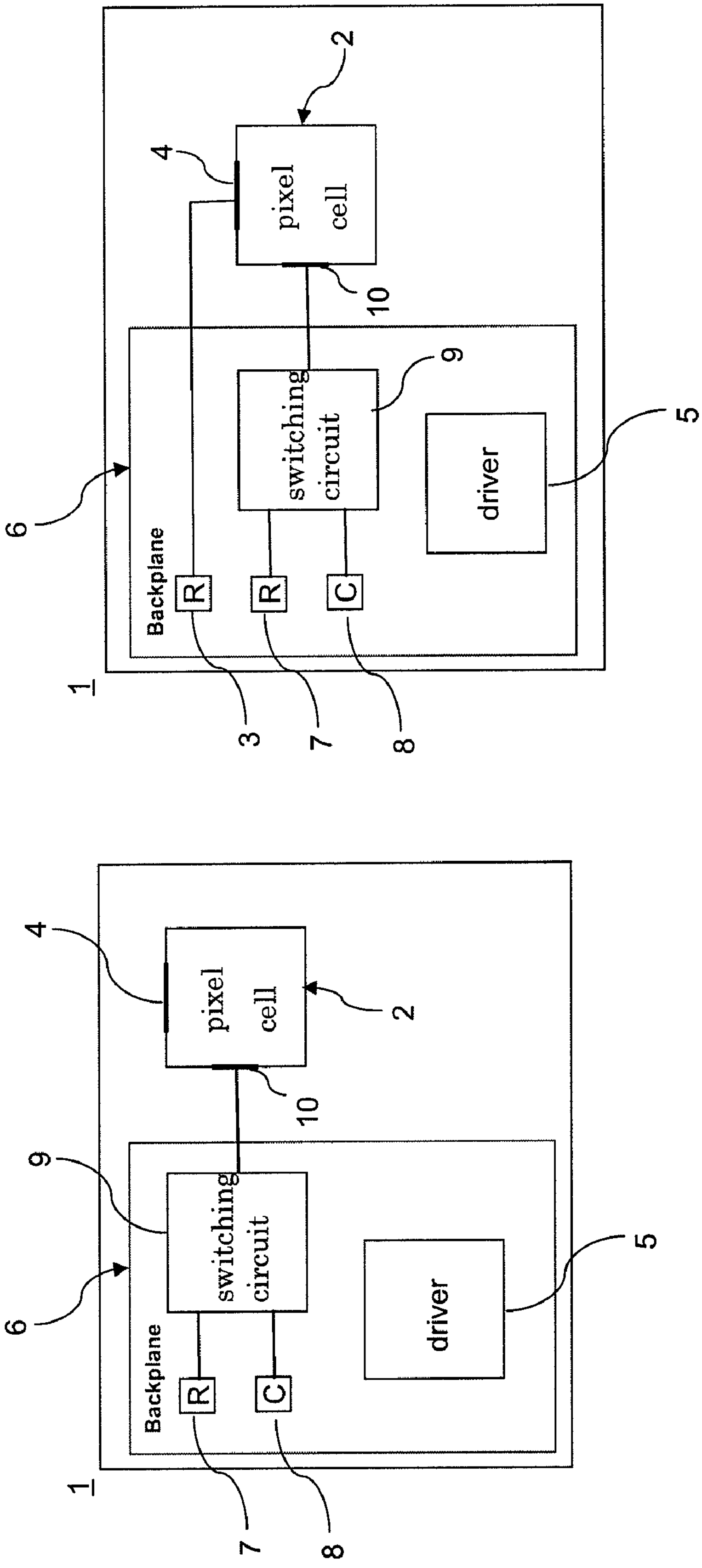
FIGS. 1A-B: are a schematic representation display apparatus according to the present invention.

FIG. 1A shows an example of a display apparatus 1. Besides a plurality of pixel cells 2, the display apparatus as shown in FIG. 1A further comprises a circuit board 6 which may be rigid but is preferably of a flexible type. The circuit board 6 comprises a plurality of switching circuits 9 for supplying a switched voltage to the pixel cells 2, where each switching circuit is connected to one pixel cell and vice versa. The switching circuit is connected to at least one of the pixel cell terminals 10, so as to vary the wetting property of the surface. As further described below, typically the switching circuit comprises an active element, typically including a thin film (field effect) transistor. It is noted that the ten switching circuit is a neutral term in the sense that it does not imply the character of the active element nor does it imply the driving methods used to control the pixelized electrofluidic cells 2. The combination of a switched circuit and a connected pixel cell is defined as a pixel of the display apparatus 1.

The circuit board further comprises a plurality of row and column electrodes 7, 8. The row and column electrodes 7, 8 are pairwise coupled to the switching circuits 9.

The circuit board further comprises a driver 5 being configured to charge the row and column electrodes 7, 8 and activate the switching circuits 9 to address a switched voltage to the pixel cells 2 via switched voltage terminal 10.

FIG. 1B shows a schematic representation of the display apparatus according to the present invention. The apparatus comprises a circuit board 6 and a plurality of pixel cells 2. Typically, the pixel cell 2 comprises at least one further pixel cell terminal 4 that is coupled to a further electrode 3 to supply a direct voltage to the pixel cell. The driver 5 is configured to additionally charge the further electrode 3, so as to bring the pixel cell 2 into an intermediate condition. This condition will be explained further below with reference to the working principle of the electrofluidic pixel cell 2. The switching circuit typically has row and column electrodes 7, 8 respectively that connect the switching circuit to the driver, although it is also possible that more or less electrodes are used depending on the specific implementation of the switching circuit.

FIG. 2 shows one embodiment of a pixel cell 20 in more detail. A pixel cell comprises a fluid holder 21. The fluid holder comprises a fluid reservoir 22 with a small visible area and comprises a channel 23 with a large visible area. The reservoir 22 and the channel 23 are connected so as to enable free movement of the polar fluid 24 and non-polar fluid between the channel and the reservoir.

Typically, besides a polar fluid 24, the fluid holder 21 also comprises a non-polar fluid (not shown). To generate a cell display property, e.g. a certain transmissive or reflective optical state of the pixel cell 20, the polar fluid 24 and the non-polar fluid have differing display properties. The non-polar fluid may occupy the space not occupied by the polar fluid. The non-polar fluid is preferably immiscible with the polar fluid. In an embodiment, the geometry of the channel 23 and the reservoir 22 are balanced to impart a differing principal radius of curvature. In such embodiments, the fluid reservoir 22 imparts a large principal radius 25 of curvature onto the polar fluid and the channel imparts a small principal radius 26 of curvature onto the polar fluid when the channel and the reservoir surfaces are sufficiently hydrophobic. This configuration results in a Young-Laplace force that aims to bring the polar fluid in its energetically most favorable shape, i.e. the droplet shape and urges the polar fluid into the reservoir 22.

On the other hand, however, due to its nature, the polar fluid 24 can move into the channel by creating an electromechanical force opposite to the Young-Laplace force. To control this force, at least part of a surface 27 of the channel comprises a wetting property responsive to an applied supply voltage to the channel wall. The polar fluid 24 may comprise a conductive element or component. Typically a hydrophobic fluoropolymer is provided on at least part of the channel surface, although other materials having a wetting property responsive to an electric field may be applied.

By applying a supply voltage to the channel surface, the induced electric field typically reduces the hydrophobic character of the fluoropolymer and results in an electromechanical force aiming to bring the polar fluid 24 from the reservoir 22 into the channel 23 that is proportional to the supply voltage over the at least part of the channel surface 27 squared.

The supply voltage changes the wetting property of at least part of the surface 27 of the channel 23 resulting in a movement of the polar fluid 24 and a change of the cell display property.

Any part of the channel that is not supplied by a voltage, i.e. electrowetted, may preferably have a small Young's angle that is close to 90 degrees in order to reduce the net Young-Laplace force that has to be overcome by the channel surface that is supplied by a voltage.

Varying the electromechanical force may be used to control the movement of the polar fluid 24 in the pixel cell 20. Therefore, the pixel cell 20 comprises at least two pixel cell terminals. The pixel cell terminals are arranged to apply a supply voltage to the at least part of the surface of the channel 23 comprising the wetting property responsive to an applied supply voltage.

The polar fluid 24 and non-polar fluid may have mutually differing display properties in order to provide a cell display property, being a pixel cell color or pixel color, also encompassing monochromatic variants.

Typically, the polar fluid 24 comprises water and the non-polar fluid comprises oil. Preferably the water is blackened and the oil is left clear, because blackening water with pigments may yield a more saturated black than blackening oil with dyes. Pigmented blackened water may result in a sufficiently black pixel color with a layer of water with a thickness of only 3 micrometer. This allows a display with a total thickness less than 100 micrometer, which typically is within a suitable thickness range for flexible displays. Typically the water contains ionic content as the conductive element.

In FIG. 2B, it can be seen that the geometry of the fluid reservoir 22 imparts a small visible area onto the polar fluid 24 and the geometry of the channel 23 imparts a large visible area onto the polar fluid 24. To create a black state, the blackened water occupies the channel 23 and the clear oil occupies the reservoir 22. In the white state, the clear oil occupies the channel 23 and the blackened water the reservoir 22. By varying the amount of black water and clear oil in the channel 23, various cell display properties, e.g. color states, may be created.

It is noted that the reservoir 22 may be hidden by a 'black mask' to obtain a more saturated black color. Alternatively the part of the channel 23 intersecting with the top of the reservoir 22 may always be occupied by the polar fluid 24 to create a more saturated black state. In practice however, due to the small visible area, the visibility of the reservoir 22 is hardly a problem.

Color Transitions: To-black and To-white

When in use, the pixels may frequently change from one color to another color. When the new color is darker than the present color, i.e. has a higher black component, the new color may be obtained by moving black water into the channel 23. This is called a to-black transition. When the new color is lighter than the present color, i.e. has a lower black component, the new color may be obtained by moving black water into the reservoir 22. This is called a to-white transition. The movement of the black water may be controlled by varying the supply voltage over the channel surface 27, thereby changing the wetting property of the surface 27.

The speed of the water in the channel is dependent on voltage.

Figure 3:
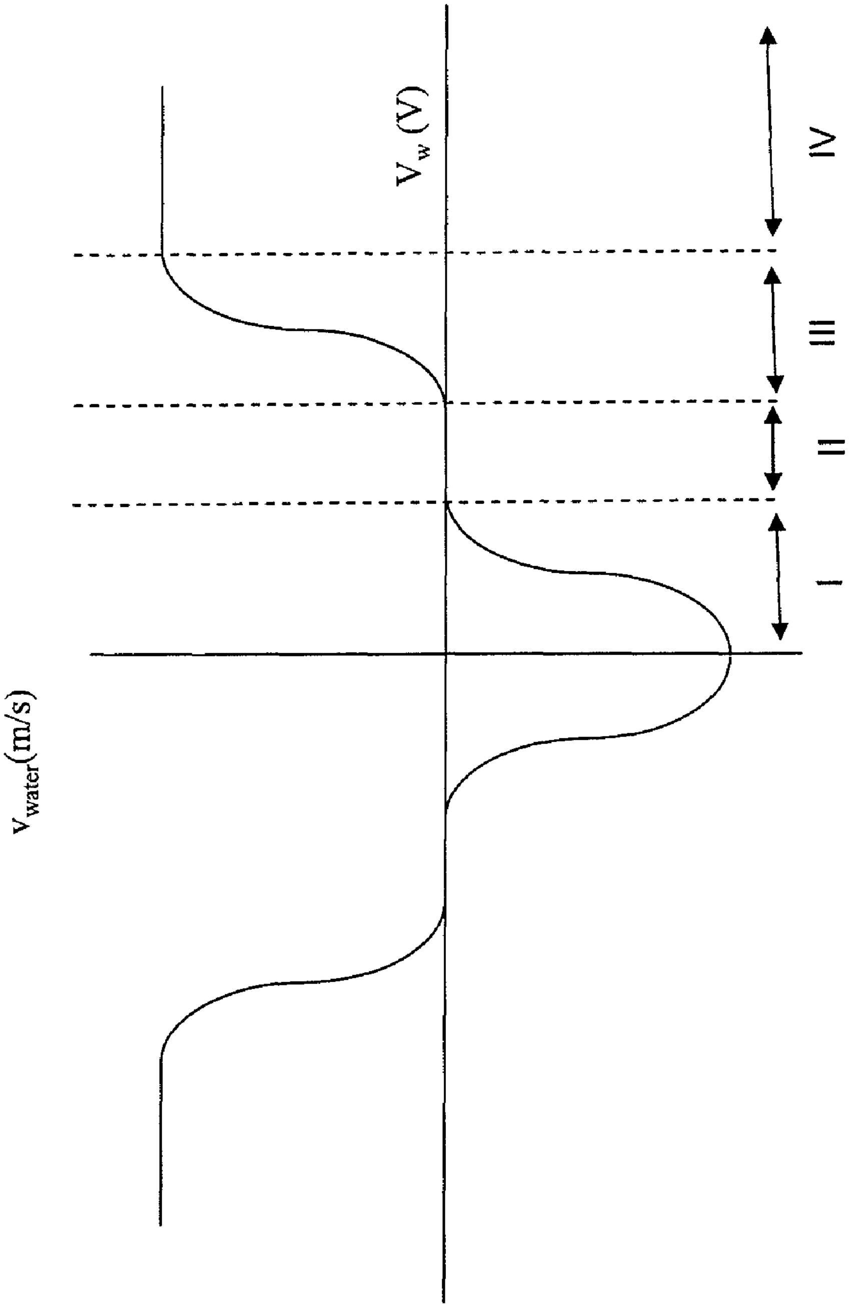
FIG. 3: is a graph of polar fluid front velocity depending on voltage.

FIG. 3 shows a schematic representation of the speed of the water v, i.e. of the front of the polar fluid 24, also referred to as the water front, as a function of the supply voltage V over the channel surface 27. The x-axis represents the supply voltage over the channel surface; the y-axis represents the speed of the water front. Since the electromechanical force Fem is proportional to the voltage squared V^2, the graph is symmetrical around the y-axis, i.e. the system gives a substantially symmetrical response around 0V.

In this graph, a positive speed means that the water moves into the channel 23 and a negative speed means the water retracts out of the channel into the reservoir 22. For convenience only the graph on the positive part of the x-axis, is considered. The graph on the negative side of the x-axis may be interpreted analogous because of symmetry reasons.

The graph may be roughly divided in four parts. In part I, from x=0, the speed starts at a negative value and steeply increases towards zero, the graph then reaches the x-axis. In part I, the Young-Laplace droplet forming force is larger than the electromechanical force.

In part II, the Young-Laplace force is substantially equal to the electromechanical force and the speed equals zero. The graph then runs over the x-axis. The width of the region part II on the x-axis is non-zero due to the effects of wetting hysteresis or a wetting barrier that is inherent to the materials used in the pixel cell 20, or that is purposely added to the pixel cell 20 to create a well-defined width for the region part II.

Subsequently, in part III, the electromechanical force becomes larger than the Young-Laplace force; the speed of the water front is positive, which means that the water moves into the channel. In this part, the graph steeply rises until a plateau is reached. The plateau is part IV wherein, although the voltage still increases and therewith the electromechanical force, the speed saturates and levels to a substantially constant value due to friction in the channel and/or due to the well known effect of contact angle saturation of the electrowetting effect.

The speed of the water front typically is in the order of centimeters per second and preferably between 0 and 50 centimeters per second, as 28 centimeters per second yields a switching speed between the black and the white state of about 1 millisecond for a pixel cell size of 0.2 millimeters (having a 0.28 millimeters diagonal size) when the reservoir is positioned in the corner of the pixel cell, which is compatible with displaying video content on the display apparatus. Depending on the channel geometry, the materials used, including the polar and non-polar fluid mixtures, the layer thicknesses and other specific geometrical and layout choices of the display apparatus and its pixels, the voltage in the stable part of the graph (part II) may be typically around 8V and the voltage at the onset of the water moving into the channel (start of part III) may be typically around 10V. The sum of the voltages squared, being proportional to the electromechanical force in the channel, is then 2×8^2=128V^2 for the stable condition and 2×10^2=200V^2 for the start of the water moving into the channel, where two equally sized bottom and top channel surface capacitors are assumed. In the driving methods of the embodiments below 119V^2 is used for the stable condition and 212V^2 for the start of the fill condition in order to calculate the voltage levels needed. These electromechanical forces are for relative use and reference only, and it is understood that similar parts I, II, and III could be achieved using only one surface capacitor, or a variety of other liquid or capacitor arrangements.

Driving a Pixel

Typically, a display is refreshed a number of times per second. The frame time is defined as the time wherein all the pixels of a display are refreshed once. The frame time comprises a line selection time, wherein the active elements of all switching circuits 9 connected to one row 7 are activated, followed by a hold time, wherein the other rows are sequentially addressed.

During the line selection time the column electrodes 8 supply the switched voltage to the switched voltage terminals of the switching circuits connected to the selected row. At the end of the line selection time, the switched voltage may be substantially equal to the column electrode voltage. This voltage induces a certain movement of the polar fluid 24 in the channel 23 during the frame time.

During the hold time all switching circuits connected to the row are deactivated. The charge supplied via the switching circuits to the switched voltage terminal 10 during the line selection time is substantially retained on the switched voltage terminal until the line selection time of the next frame.

The pixel capacity may be represented as the capacitance of (a number of connected) plate capacitors. For a plate capacitor applies Q=C·V, in which Q=electric charge C=capacitance V=voltage difference over the plates Q persists when the voltage source is switched off. It is noted that a persisting Q is an approximation, since Q will leak away over time. However, leaking time typically is much higher than the frame time.

For the capacitance C applies C=∈A/d, in which

∈=permittivity

A=surface area of the parallel plates d=distance between the plates

A channel filled with an oil layer of approximately 3-5 micrometers acts as a single capacitor with substantially the oil as a dielectric. The dielectric constant ∈ of oil is approximately 2.5.

During a pixel color transition, oil in the channel is replaced by water or vice versa. This replacement changes the capacitance of the pixel. For EFC pixel cells, the color or more precise the transmittivity or reflectivity is a function of the pixel capacitance C. This differs from electrophoretic display variants, wherein the reflectivity is a function of the (time integral) supply voltage V or liquid crystal display media where the transmittivity or reflectivity is a function of the supply voltage V.

The behavior of the polar fluid during the hold time depends on whether it is a to-black color transition or a to-white color transition.

To-black Transition

In case of a to-black transition, clear oil in the channel is replaced by black water. The water, containing ionic content, forms a parallel conductive plate at the part of the surface 27 of the channel that is covered by an electrode thereby forming capacitors with the fluoropolymer and optional additional isolating layers as the dielectric. Depending on the embodiment of the switching circuit 9 the capacitors are placed in series or only one of the capacitors is connected to the switching circuit. Because of the large difference in thickness of the dielectric, i.e. the distance between the plates d, both the total capacitance of the capacitors placed in series as well as the total capacitance of one of the capacitors in the pixel, C, will become larger.

After the line selection time, the charge on the pixel, Q, will substantially persist, the pixel capacitance, C, will increase and the voltage difference, V, over the pixel capacitors will decrease. Therewith the electromechanical force Fern that is proportional to the voltage squared V^2 will decrease. V will continue to decrease until Fern is balanced with the Young-Laplace droplet forming force and the polar fluid front stabilizes. This balance is reached at or near the part II region of FIG. 3. Alternative or additional driving mechanisms to counteract the Young-Laplace force are conceivable, such as additional electrodes placed in the reservoir.

To-white Transition

In case of a to-white transition, black water, containing ionic content, is replaced by clear oil and the capacitance of the pixel will decrease, as explained above. After the line selection time, the charge on the pixel, Q, will substantially persist and the voltage difference, V, over the pixel capacitors will increase. Therewith the electromechanical force Fern will increase until Fern is in equilibrium with the Young-Laplace droplet forming force and the water front stabilizes.

Thus, by providing a certain voltage to the pixel cell having a certain color, within the frame time, the color will change into a new color.

The switching speed of pixel cells typically is in the order of milliseconds. This makes it possible to show video content on the screen. A color display variant may be implemented by using water of different colors for different pixel cells, for example red, green and blue or cyan, magenta and yellow, or by providing a color filter on top of a black and white display or by integrating the color filter in the display on or near the channel surface 27.

The electrofluidic chromatophore technique is described more elaborately in the yet unpublished joint SUN/Cincinnati patent applications:

1. U.S. Provisional Application Ser. No. 60/971,857, filed on Sep. 12, 2007.

2. U.S. Provisional Application Ser. No. 61/055,792, filed on May 23, 2008

These publications are incorporated herein by reference.

It is found that in the display configuration as described above, wherein a pair of row and column electrodes is coupled to the switching circuit for applying a supply voltage over at least part of the surface of the channel, a typical voltage swing over the switching circuit may be such that the voltages may result in a shorter lifetime of a standard thin film (field effect) transistor (TFT) active element or should be handled by expensive components capable of handling high voltages relative to the voltages used in liquid crystal and electrophoretic displays and consumes a relatively high amount of power due to the relatively high voltages used compared to liquid crystal and electrophoretic displays.

To overcome this, according to an aspect of the invention the pixel cell comprises at least one further pixel cell terminal that is coupled to a further electrode to supply a direct voltage to the pixel cell. In addition, the driver is further configured to additionally charge the further electrode, so as to bring the pixel cell into an intermediate condition.

The one further electrode for supplying a direct voltage may be applied in 'common operation'. This means that the direct voltage is applied using one common electrode for all pixel cells in the display that is charged by driver 5.

However, preferably, the further electrode is operated 'row-at-a-time', which means that the direct voltage is applied using one additional electrode per row of the display that are all charged by driver 5. In that case the further electrode is also referred to as a second row electrode.

It is also possible that the further electrode is coupled to a direct voltage circuit per pixel. The direct voltage circuit is then coupled to the driver 5 by electrodes, typically a row and column electrode used to address and charge the circuit.

The driver can have a separate integrated circuit controlling the one or more further electrodes or have one combined integrated circuit for both the row electrodes as well as the further electrodes. The latter is possible because the voltages and the frequencies of the pulses are comparable on both sets of electrodes.

Intermediate Condition

The intermediate condition of the pixel cell is the state of the pixel cell wherein the possible cell display property changes are limited due to the supply of a direct voltage to the at least one further pixel cell terminal with the aim to reduce the switched voltage required to induce a change in the cell display property. In the intermediate condition, a basic supply voltage is provided by at least one further pixel cell terminal that is coupled to a further electrode to supply the direct voltage to at least part of the surface of the channel comprising the wetting property. The basic supply voltage is the supply voltage difference applied over the channel surface, generating the minimum electromechanical force in the pixel cell in the intermediate condition. Depending on the specific terminal configuration the basic supply voltage may be provided as a combination of voltage differences between any of the pixel cell terminals.

This basic supply voltage is supplied over the at least part of the surface of the channel comprising the wetting property thus resulting in a voltage dependent wetting property of the surface of the channel.

Typically, preferably, this direct voltage, provided by the direct voltage terminal, creates a basic supply voltage that is substantially equal to or less than a supply voltage generating an electromechanical force that is equal to the Young-Laplace droplet forming force, indicated by part II in FIG. 3; generally referred to as a 'stable voltage'. A larger electromechanical force may then be created by applying a certain voltage to the switched voltage terminal. In the below examples, this will be further elucidated.

In one embodiment, the driver may be configured to provide the direct voltage, and a substantially minimal switched voltage, the direct voltage resulting in a basic supply voltage that stabilizes the amount of polar fluid in the channel, and wherein the driver is configured to supply a substantially non-zero switched voltage resulting in a supply voltage that moves the polar fluid into the channel. At the same time, preferably, the driver is configured to provide the direct voltage, in addition to supplying a stabilizing non-zero switched voltage, the combination of which results in a supply voltage that stabilizes the amount of polar fluid in the channel. The driver is then configured to move the polar fluid out of the channel, when reducing the switched voltage.

Two embodiments of the display apparatus will be discussed wherein at least one further pixel cell terminal is directly connected to a further electrode as a direct voltage terminal, to supply a direct voltage to said pixel cell. The first embodiment is the so-called 'bottom-directly-connected' embodiment and the second embodiment is the so-called 'water-directly-connected' embodiment. Further, for each embodiment, a driving method is discussed.

Figure 6A:
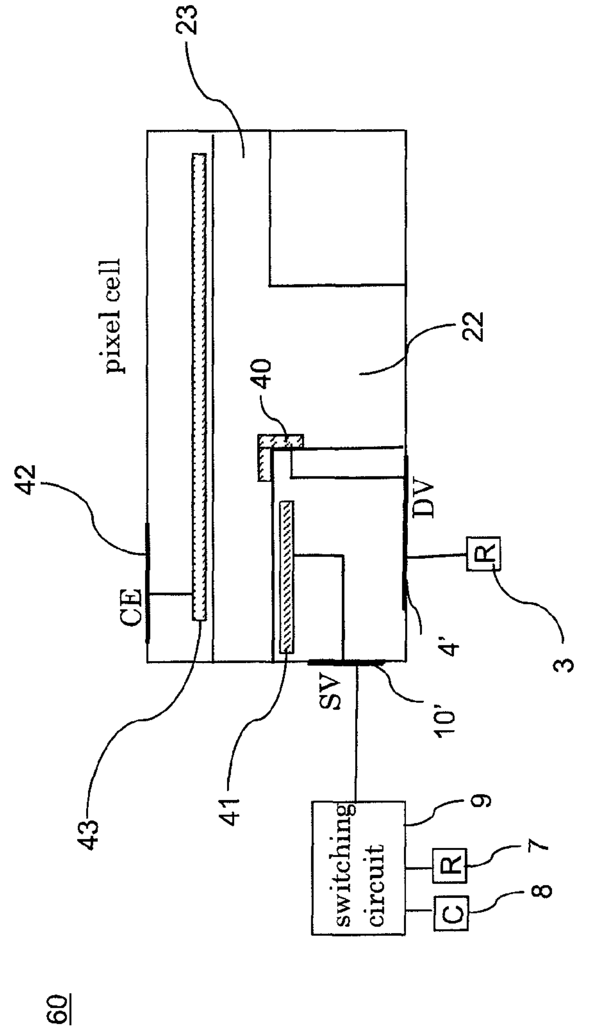
FIGS. 6A-B: are a schematic representation of the water-directly-connected embodiment of the display apparatus according to the present invention.

FIGS. 4 and 6 are examples of the general concept, wherein the pixel cell comprises a common electrode terminal 42, a switched voltage terminal 10, 10', respectively, and a direct voltage terminal 4, 4', respectively; the common electrode terminal 42 being coupled to a first channel electrode 43, also referred to as the top channel electrode or top electrode; the switched voltage terminal 10 being coupled to the switching circuit 9 and the direct voltage terminal 4, 4' being coupled to a further electrode 3. The common electrode 42 has only one connection to the driver 5 for all pixels in the display apparatus and is therefore common for all pixel cells.

Bottom Directly Connected

Figure 4A:
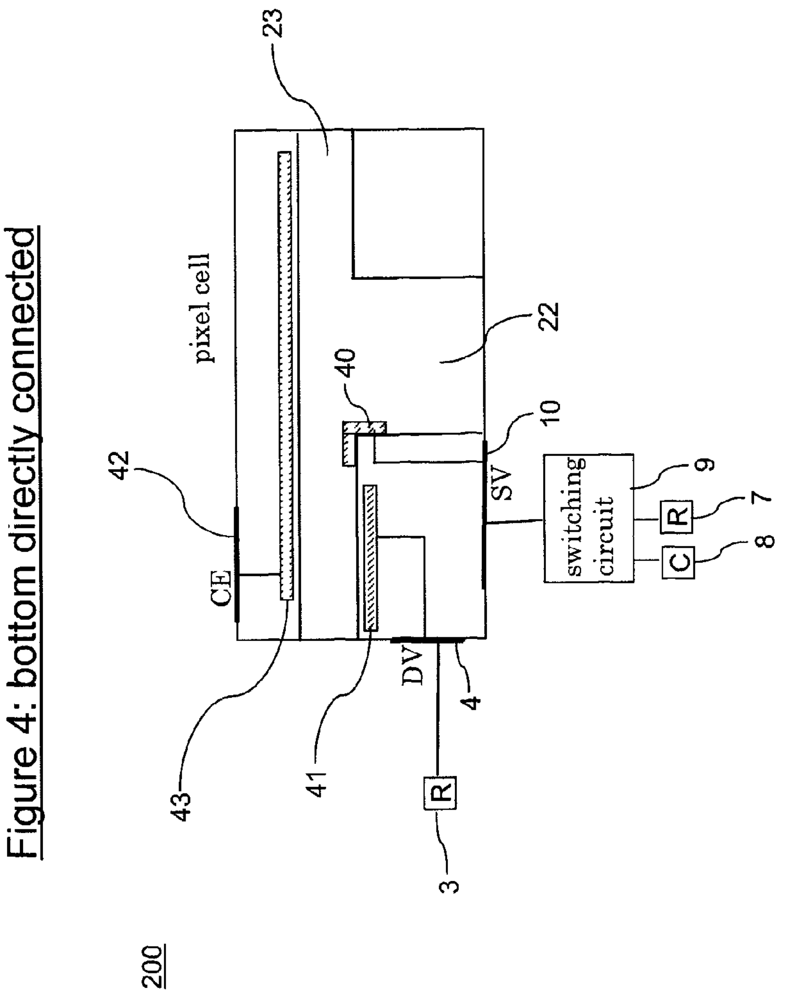
FIGS. 4A-B: are a schematic representation of the bottom-directly-connected embodiment of the display apparatus according to the present invention.
Figure 4B:
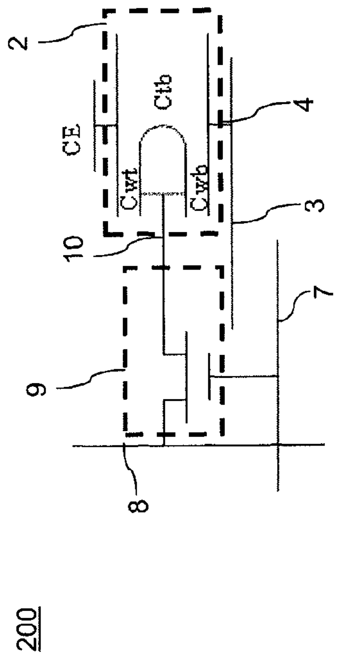

In the example of FIG. 4A an embodiment is shown of the display apparatus 200, wherein the polar fluid is conductive, wherein the switched voltage terminal 10 is coupled to a contact electrode 40, also referred to as the water electrode, contacting the conductive polar fluid and the direct voltage terminal 4 is coupled to a second channel electrode 41. The direct voltage terminal is coupled to a second channel electrode 41, also referred to as the bottom channel electrode. The switching circuit can for example be implemented by use of a thin film (field effect) transistor (TFT) as shown in the electrical circuit of FIG. 4B. The TFT can be brought into a conductive state by a select voltage on the row electrode. The voltage on the column electrode 8 is then transferred to the switched voltage terminal 10. The TFT can be brought into the non-conductive state by a non-select voltage on the row electrode. The switched voltage terminal is then effectively isolated from the column electrode.

Figure 5:
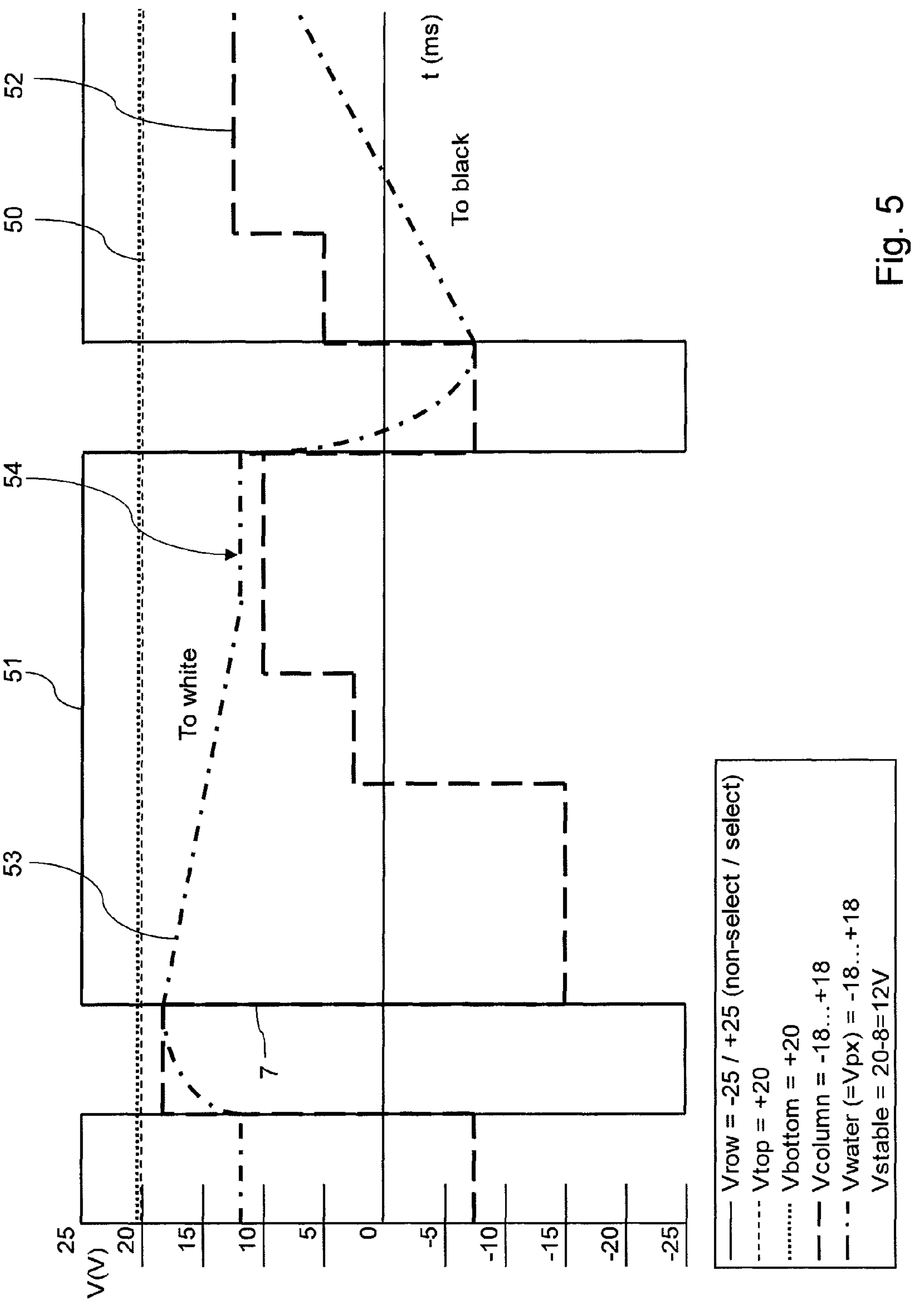
FIG. 5: is a standard driving method for the bottom-directly-connected embodiment.

FIG. 5 shows a driving method for the bottom directly connected embodiment of the display apparatus as shown in FIG. 4. The voltage on the top channel electrode (Vtop) indicated by line 50 is 20V. The direct voltage on the bottom channel electrode (Vbottom) also indicated by line 50 is identical to Vtop, also 20V. The row electrode voltage (Vrow), as indicated by line 51 is −25V (select) or 25V (non-select). The row is selected during the line selection time when the active element of the switching circuit is activated, e.g. by using a p-type TFT as the active element. The row is at the non-select voltage during the hold time. The frame time is typically 20 milliseconds.

It can be seen that the switched voltage (Vpx), indicated by line 53, gradually increases during the line selection time until it is substantially equal to the column electrode voltage (Vcolumn), indicated by line 52, of 18V.

During the hold time, the row electrode voltage (Vrow) is 25V, and the switched voltage reaches a stable voltage 54 of 12V where the amount of polar fluid in the channel does not change anymore and a new pixel color is obtained. Since this driving method example regards a so-called to-white transition, the black water moves out of the channel into the reservoir. This decreases the pixel capacitance and accordingly increases the supply voltage on the pixel cell terminals; in particular, the supply voltage formed as a voltage difference between the top channel electrode and the water electrode and between the bottom channel electrode and the water electrode. It should be clear that any number of additional supply voltages may be provided to any number of channel surfaces, to provide an additional electromechanical force.

The switching speed of the pixel determines the speed at which the stable voltage is reached. During the hold time the pixels connected to the other row electrodes in the display are addressed with possibly different column electrode voltages (Vcol, line 52) in order to switch said pixels of display apparatus 200 to a pixel color.

Water Directly Connected

Figure 6B:
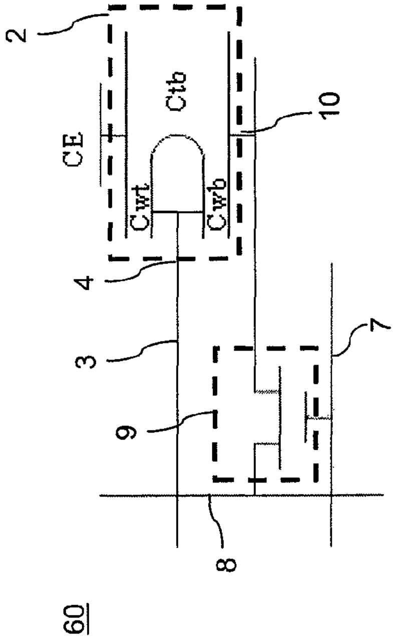

FIG. 6 shows an embodiment of a display apparatus 60 according to the present invention, wherein the polar fluid is conductive and wherein the switched voltage terminal 10 is coupled to a bottom channel electrode 41 and the direct voltage terminal 4' is coupled to a contact electrode 40 contacting the conductive polar fluid. The switching circuit 9 can be implemented by use of a thin film (filed effect) transistor (TFT) as shown in the electrical circuit of FIG. 6B.

Figure 7:
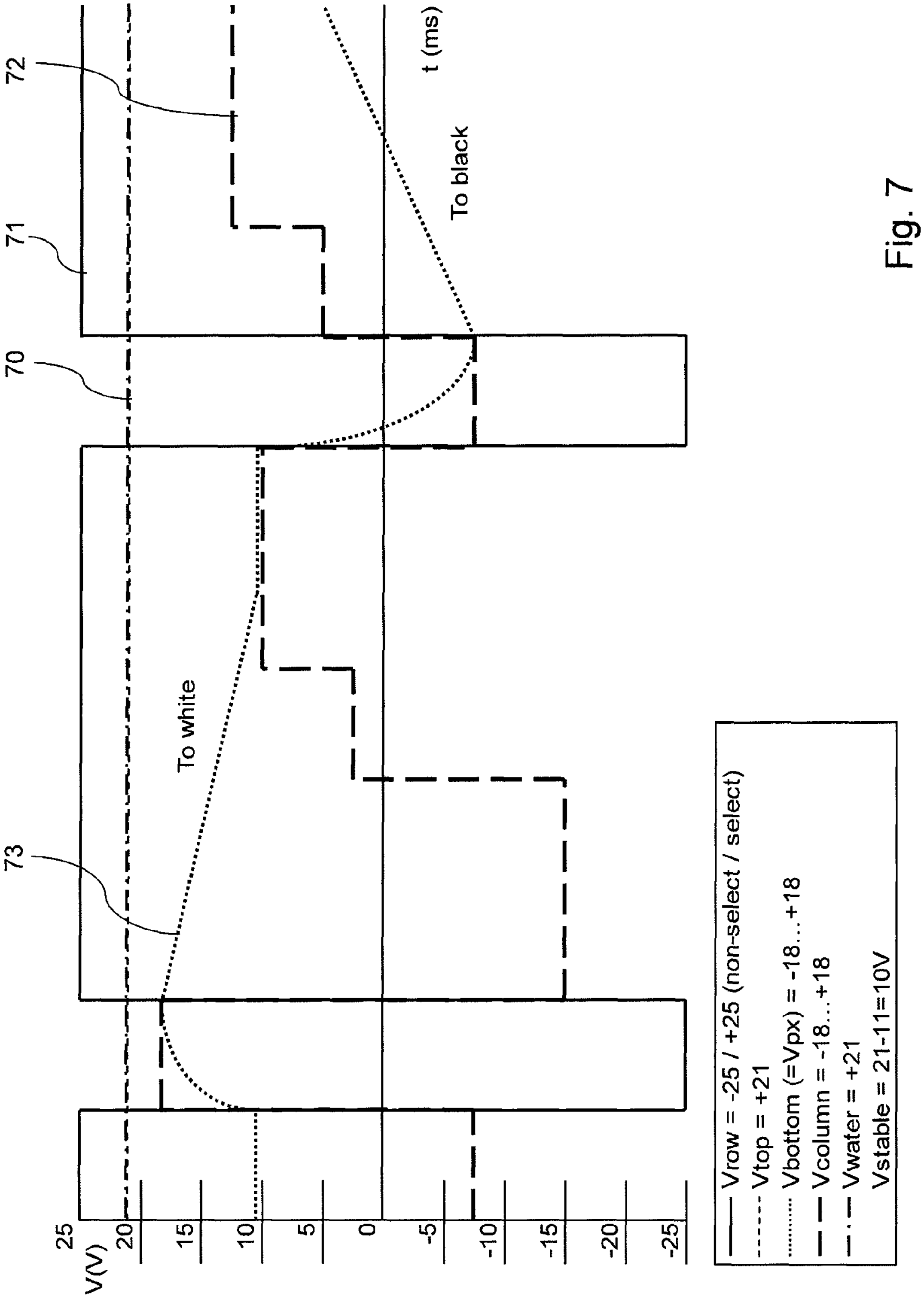
FIG. 7: is a standard driving method for the water-directly-connected embodiment.

FIG. 7 shows a driving method for the water directly connected embodiment of the display apparatus 60 as shown in FIG. 6.

The voltage on the top channel electrode (Vtop) indicated by line 70 is 21V. The direct voltage on the water (Vwater) is identical to Vtop, also 21V (line 70).

The row electrode voltage (Vrow), as indicated by line 71 is −25V (select) or 25V (non-select). The row is selected during the line selection time when the active element of the switching circuit is activated. The row is at the non-select voltage during the hold time. The frame time is typically 20 milliseconds.

It can be seen that the switched voltage (Vpx), indicated by line 73, gradually increases during the line selection time until it is substantially equal to the column electrode voltage (Vcolumn), indicated by line 72, of 18V.

During the hold time, wherein Vrow is 25V (non-select), the switched voltage returns to a stable voltage of 11V when the new pixel color is obtained. Since this driving method example regards a so-called to-white transition, the black water moves from the channel into the reservoir. This decreases the capacitance and increases the voltage difference between the water electrode and the bottom electrode.

The switching speed of the pixel determines the speed at which the stable voltage is reached. During the hold time the pixels connected to the other row electrodes in the display are addressed with possibly different column electrode voltages (Vcol, line 72) in order to switch said pixels of display apparatus 60 to a pixel color.

In these examples, the voltage swing over the switched voltage terminal and the column electrodes ranges from −18V+18 V, while the swing over the row electrodes ranges from −25V to 25V, which provides a substantial load for the switching circuit 9 and the driver 5. It is a desire to reduce this swing while maintaining switching functionality.

Mechanism for Reducing the Voltage Swing Over the Switching Circuit

To decrease the voltage swing over the switching circuit in the driving method as depicted in FIG. 7 a predefined voltage difference may be applied between the two pixel cell electrodes that are not connected to the switching circuit 9, e.g. between the top 43 and the water electrode 40 in a 'water directly connected' configuration (FIG. 6). In this way, the pixel cell comprises at least one further pixel cell terminal 4' that is coupled to a further electrode, in this example the water electrode or contact electrode 40 to supply a direct voltage to the pixel cell. The driver is further configured to additionally charge the further pixel cell terminal 4' so as to bring the pixel cell of display apparatus 60 into an intermediate condition.

The basic supply voltage is provided to the pixel cell in a condition that the voltage difference between the switched voltage terminal 10' connected to the switching circuit 9 and the water electrode equals zero. In that condition the electromechanical force on the bottom channel surface is substantially zero, resulting in the electromechanical force being induced by the voltage difference between the top and the water electrode. Any voltage difference between the switched voltage terminal and the water electrode will increase the electromechanical force beyond the force induced by the basic supply voltage.

The maximum speed with which the water retracts in the reservoir 22 will decrease, depending on the magnitude of the predefined voltage difference between the top channel electrode and the water electrode. For some applications of the present invention, this may be advantageous, as the water may also start to move into the channel 23 at a lower switched voltage. By using this mechanism the voltage swing may be reduced, that is, the operating range of an applied switching voltage on the row and column electrodes for providing switched voltages to the pixel cell in dependence of a specified pixel color change may be reduced nearly by half.

Multiphase Driving Method

While applying a specified direct voltage to the pixel of display apparatus 60 may reduce a voltage swing over the switched voltage terminal 9, a multiphase driving method may further reduce said voltage swing. Accordingly, preferably, the driver is configured to provide a cell display property change by multiphased charging of the further electrode to define a plurality of intermediate conditions. Thus, a driver operating a multiphase driving method involves setting individual pixel cells to multiple intermediate conditions, applied sequentially in time to provide a new cell display property. Alternatively, or additionally, multi phased charging could involve applying multiple, mutually different intermediate conditions to selected groups of pixels dependent on their selected cell display property change.

In particular, with a two-phase scheme, a next pixel color is reached in two phases instead of one. As an example, in the first phase the pixel may be either only be driven towards the black state or only towards the white state to reach the intermediate pixel color and in the second phase from the intermediate pixel color towards the desired pixel color. This may be done by supplying a different direct voltage to the pixel cell during the two phases that brings the pixel cell into two different intermediate conditions.

The total (cumulative) change of the cell display property, i.e. the pixel color, from the start of the first phase until the end of the last phase in a multiphase driving method is referred to as a multiphase cell display property change or a multiphase pixel color change.

The two phases can each have the length of one or more frame times, but preferably the two phases are part of one frame time, each phase having a line selection time for each row in the display. The two line selection times are spaced such that there is sufficient time to reach the intermediate pixel color in the first phase, the so-called phase spacing. The phase spacing is dependent on the switching speed of the polar/non-polar fluid system as a function of the supply voltage over the channel surface. Preferably the phase spacing is an integer multiple of the line selection time. During the phase spacing the pixels connected to a number of other rows are addressed. After the line selection time of the second phase the remainder of the frame time is the hold time where the row is in its non-select state and the pixels connected to the rest of the rows are addressed. The second row electrode 3, coupled to the direct voltage terminal 4', has a connection to the driver 5 per row of pixels. The voltage on the second row electrode may be changed at the start of a phase to set the intermediate condition. In some embodiments, the intermediate condition may even be changed during a phase, e.g. by applying varying voltage levels on the second row electrode to set additional intermediate conditions during that phase. Preferably the voltage on the second row electrode may be changed when the row electrode connected to the same pixels actives the switching circuit of the pixels, i.e. at the start of a line selection time.

In order to show moving images the frame time should be in the order of 20 milliseconds and during the majority of the frame time, preferably 60% or more of the time, the pixel should be at a constant color or grey tone, meaning that the transition to the next color should occupy a minority of the frame time, preferably 40% or less.

For a slow switching system, i.e. a display apparatus with pixels having long color transition times compared to a display apparatus that is capable of displaying moving images, the phases and also the phase spacing can be as long as multiple frame times.

In addition to a reduction of the voltage swing over the switching circuit, a multi-phase driving method may eliminate transition errors. A transition error is the mismatch between the desired pixel color and the achieved pixel color at the end of a transition between the two pixel colors. Because the next pixel color is achieved from a previous pixel color small inaccuracies in the transition from the previous to the next pixel color may accumulate. A two-phase driving method may prevent error accumulation because the transition to a new pixel color can go via a reset state being the completely black state or the completely white state, since the completely black and the completely white states are ‘perfect’, faultless reference colors without any transition error due to the nature and build-up of the pixel cell. Hence, the multiphase driving method is able to switch the pixel to a reset state during one of the phases so that in a next phase a new supply voltage may provide a specified pixel color without a (cumulative) transition error. In general it may be freely chosen whether the transition goes via the completely white state or via the completely black state. In addition, other references may be used, in particular, pixel cell polar fluid front movement barriers as further explained here below.

Figure 8:
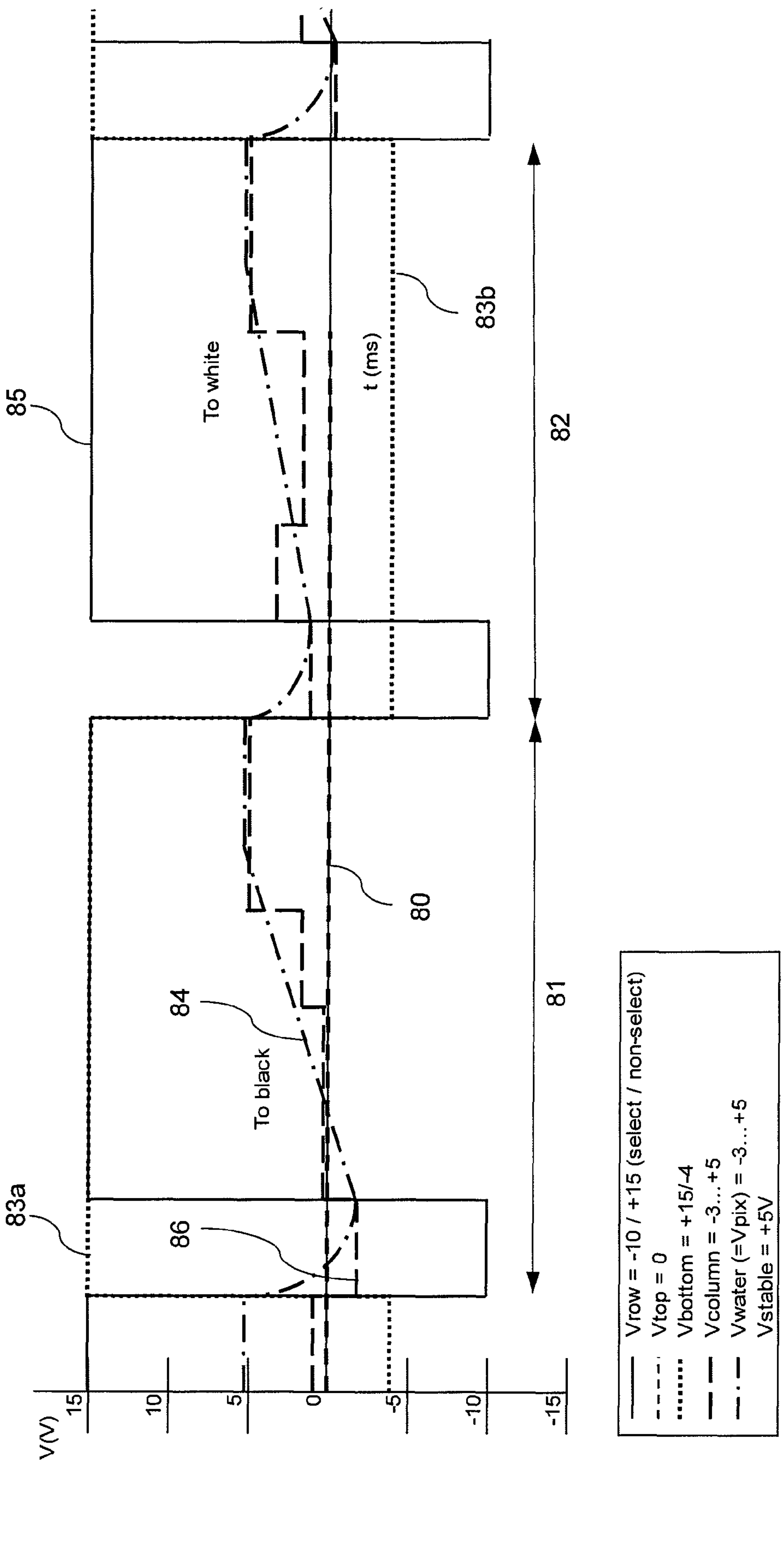
FIG. 8: is a driving method for the bottom-directly-connected embodiment.
Figure 9:
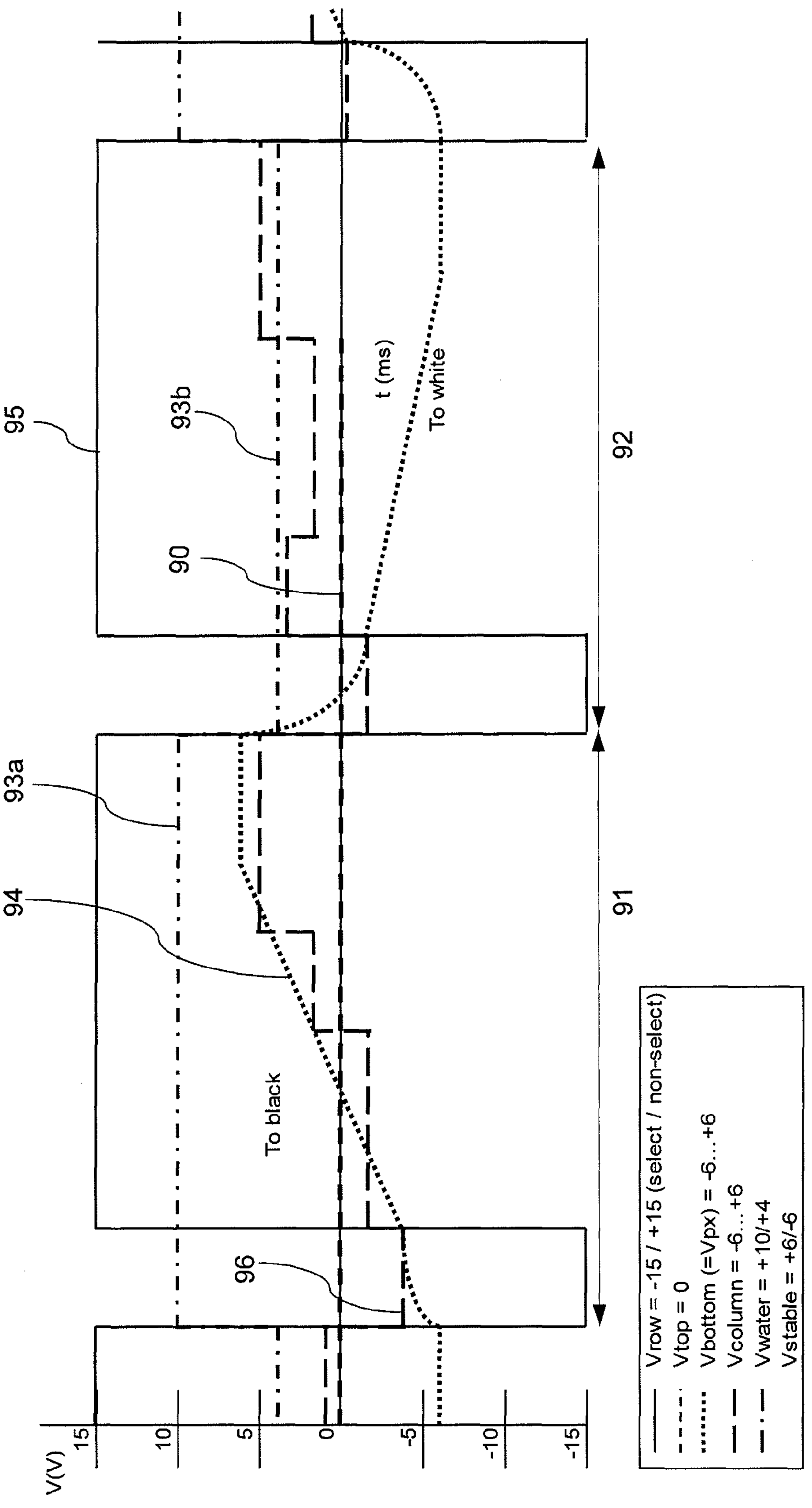
FIG. 9: is a driving method for the water-directly-connected embodiment.

FIGS. 8 and 9 show multiphase driving methods for the bottom directly connected embodiment (FIG. 4) and for the water directly connected embodiment (FIG. 6) respectively. In these schemes, the driver is configured to supply a direct voltage to the pixel cell 200 that sets the intermediate condition of the pixel cell dependent on the display property change. Hence, pixels of the display apparatus 200, 60, respectively may be addressed in multiple phases depending on their individual change in pixel color; in this way, in a first phase, a set of pixels may be addressed that are identified to a change associated with a ‘to black’ condition, wherein the polar fluid is moved into the channel, a so-called ‘to black’ phase; and in a second phase, another set of pixels may be addressed that are identified to have a change associated with a ‘to white’ condition, wherein the polar fluid is moved out of the channel, a so-called ‘to white’ phase. It is possible that a set of pixels is addressed during more than one phase in order to change the pixel color to a certain state. It is also possible to interchange the ‘to black’ and the ‘to white’ phases in time. During each phase a different intermediate condition is used. These driving methods will be referred to as change dependent driving methods.

Driving Method Bottom-directly-connected

FIG. 8 shows an exemplary change dependent driving method for a bottom-directly-connected embodiment of the display apparatus as shown in FIG. 4. The common electrode terminal 42 is coupled to the top channel electrode 43. The direct voltage terminal 4 is coupled to the bottom channel electrode 41. The switched voltage terminal 10 is coupled to the water electrode 40. The direct voltage is supplied to set the intermediate condition of the pixel cell dependent on the display property change.

In particular, the intermediate ‘to black’ condition (polar fluid moving into the channel 23) is set by supplying the bottom electrode 41 with Vbottom equals +15 V (line 83*a*); or the intermediate ‘to white’ condition (polar fluid moving out of channel 23) is set by supplying the bottom electrode 41 with Vbottom equals −4 V (line 83*b*). The voltage on the bottom electrode is changed at the start of a line selection time, i.e. at the start of each phase.

The voltage on the top channel electrode 43 (Vtop) indicated by line 80 is held at 0V. The top channel voltage 43 may also be held at the kickback voltage. The kickback voltage is the voltage jump contributing to the switched voltage on the pixel cell in the hold period when the row is switched from the select state to the non-select state at the end of the line selection time. This is a well-known capacitive coupling effect in active-matrix displays. The effect of the kickback voltage on the switched voltage and on the voltage levels of other electrodes is not shown in FIG. 8 or in figures showing the driving methods of the other embodiment, but can simply be added.

The water electrode is connected to the switched voltage terminal 10 that is modulated by the switching circuit 9. During the first phase 81 the pixel color is either not changed or changed towards the black state, while during the second phase 82 the pixel color is either not changed or changed towards the white state. The direct voltage terminal 4 is coupled to a further electrode 3 that is parallel to the row electrodes 7. The water electrode voltage (line 84), connected to the switching circuit, is modulated to achieve the correct grey level.

To-black Modulation—First Phase 81

The direct voltage on the bottom channel electrode (Vbottom) indicated by line 83*a* is 15V. The row electrode voltage (Vrow), indicated by line 85 is −10V (select) during the line selection time of the first phase and 15V (non-select) during the phase spacing.

It can be seen that the switched voltage (Vpx), indicated by line 84, gradually decreases during the line selecting time until it has reached the column electrode voltage of −2V, indicated by line 86.

During the phase spacing, wherein Vrow is 15V, the switched voltage returns to a stable voltage of 5V and the intermediate color of the pixel is obtained. Since this phase of the driving method example regards a so-called to-black transition (first phase 81), the black water moves from the reservoir 22 into the channel 23. This increases the pixel capacitance and decreases the voltage difference between the top channel electrode 43 and the water electrode 40 and between the water electrode 40 and the bottom channel electrode 41.

During the phase spacing the pixels connected to a number of other row electrodes in the display are addressed with possibly different column electrode voltages (Vcol, line 86) in order to switch said pixels of display apparatus 200 to a specified (intermediate) color. In this example, the voltage operating range Vcolumn, line 86 of the switching circuit 9, necessary to move the fluid into the channel 23 is reduced substantially. In particular, in this example, in the first phase 81 the driver 5 is configured to provide the direct voltage 83*a* of 15 V, with a top electrode voltage 80 of 0V. The switched column electrode voltage 86 varies between −3V and 5 V and defines a substantial minimal switching range. The direct voltage 83*a* of 15V sets an intermediate condition resulting in a predefined basic supply voltage that minimizes an electromechanical force in the channel 23. In this example, the condition of minimum electromechanical force, being proportional to the sum of the voltage squared over the channel surfaces, would be reached when the switched voltage would equal 7.5V, thereby defining the condition of the basic supply voltage in this phase 81. The driver 5 is further configured to supply a column electrode voltage resulting in a switched voltage that creates an increased electromechanical force that moves the polar fluid into the channel, when the switched voltage terminal is charged to a voltage below 5V.

To-white Modulation—Second Phase 82

The direct voltage on the bottom channel electrode (Vbottom) indicated by line 83*b* is −4V. The row electrode voltage (Vrow), indicated by line 85 is −10V (select) during the line selection time of the second phase and 15V (non-select) during the hold time.

The voltage on the row electrode activates the switching circuit 9 during the line selecting time with Vselect equals −10V.

It can be seen that the switched voltage (Vpx), indicated by line 84, gradually decreases during the line selection time until it has reached the column electrode voltage (Vcolumn), indicated by line 86, of 2V.

During the hold time, wherein Vrow is 15V (non-select), the switched voltage 84 returns to a stable voltage of 5V when the new pixel color is obtained. This phase of the driving method example regards a so-called to-white transition, wherein the black water moves from the channel 23 into the reservoir 22. This decreases the pixel capacitance and increases the voltage difference between the top channel electrode 43 and the water electrode 40 and between the water electrode 40 and the bottom channel electrode 41.

During the hold time the pixels connected to a number of other row electrodes in the display are addressed with possibly different column electrode voltages (Vcol, line 86) in order to switch said pixels to the specified (intermediate) pixel color.

In this example, the voltage swing Vcolumn over the switching circuit 9 ranges from −3V-5V which is a significant reduction compared to the standard, one-phase driving schemes. The voltage swing Vrow over the switching circuit ranges from −10V-15V which is also a significant reduction compared to the standard, one-phase driving schemes. This enables the use of standard active elements in the switching circuit of the display and drivers with a standard voltage range of about −7V to +7V for column driver ICs and about −15V to +15V for row driver ICs and results in a significant reduction of the power consumption of the display, as the power consumption is proportional to the voltages used in the display squared.

Driving Method Water-directly-connected

FIG. 9 shows an exemplary driving method for a water directly connected embodiment of the display apparatus shown in FIG. 6. The common electrode terminal 42 is coupled to the top channel electrode 43. The direct voltage terminal 4' is coupled to the water electrode 40. The switched voltage terminal 10 is coupled to the bottom channel electrode 41. The direct voltage is supplied to set the intermediate condition of the pixel cell. Voltages are depicted during both phases of the 2-phase driving method for a certain pixel. The row electrode voltage, indicated by line 95, is −15V (select) or 15V (non-select).

The voltage on the top channel electrode (Vtop), indicated by line 90, is held at 0V. The top channel voltage may also be held at the kickback voltage. The water electrode voltage is directly connected to direct voltage terminal 4' that is modulated per phase. During the first phase 91 the pixel cell is set in the intermediate 'to black' condition, while during the 2nd phase 92 the pixel cell is set in the intermediate 'to white' condition by applying a certain direct voltage to the direct voltage terminal 4'. The water voltage line 93*a*, 93*b* show the direct voltages of +10V, to set the intermediate 'to black' condition, and +4V, to set the intermediate 'to white' condition, respectively provided to water electrode 40. The bottom electrode voltage line 94, connected to the switching circuit 9, is modulated to achieve the correct pixel color.

To-black Modulation Phase—First Phase 91

In this phase, the direct voltage on the water electrode (Vwater) indicated by line 93*a* is 10V. The voltage on the column electrode (Vcolumn), indicated by line 96, provides a switched voltage of −4V during the line selecting time. It can be seen that the switched voltage (Vpx), indicated by line 94, gradually increases during line selecting time from −6V until it has reached the column electrode voltage of −4V.

During the phase spacing, wherein Vrow is 15V (non-select), the switched voltage returns to a stable voltage of 6V and the intermediate color of the pixel is obtained. Since this phase of the driving method regards a so-called to-black transition, the black water moves from the reservoir into the channel 23. This increases the capacitance and decreases the voltage difference between the water electrode and the bottom channel electrode.

During the phase spacing the pixels connected to a number of other row electrodes in the display are addressed with possibly different column electrode voltages (Vcol, line 96) in order to switch said pixels of the display apparatus 60 to their specified (intermediate) color.

To-white Modulation—Second Phase 92

The direct voltage on the water electrode (Vwater) indicated by line 93*b* is 4V.

It can be seen that the switched voltage (Vpx), indicated by line 94, gradually decreases during the line selection time from 6V until it has reached the column electrode voltage (Vcolumn), indicated by line 96, of −2V.

During the hold time, wherein Vrow is 15V (non-select), the switched voltage returns to a stable voltage of −6V where the new pixel color is obtained. Since this phase of the driving method example regards a so-called to-white transition, the black water moves from the channel 23 into the reservoir 22. This decreases the capacitance and increases the voltage difference between the water electrode and the bottom channel electrode.

During the hold time the pixels connected to a number of other row electrodes in the display are addressed with possibly different column electrode voltages (Vcol, line 96) in order to switch said pixels to the specified (intermediate) color.

In this example, the voltage swing Vcolumn over the switching circuit 9 ranges from −6V-6V which yields a significant reduction compared to the standard, one-phase driving schemes, compare the switching voltage range of 36 Volt in FIG. 7. The switching voltage range Vrow over the switching circuit ranges from −15V-15V which is also a significant reduction compared to the standard, one-phase driving schemes. This enables the use of standard active elements in the switching circuit of the display and drivers with a standard voltage range and results in a significant reduction of the power consumption of the display.

Storage Capacitor

FIG. 10 shows embodiments of the display apparatus according to the present invention, wherein a pixel of the display apparatus 100, 150 further comprises a storage capacitor 101 being connected between the switched voltage terminal 10 and the direct voltage terminal 4. In FIG. 10A a bottom-directly-connected embodiment is shown with a storage capacitor 101, and in FIG. 10B a water-directly-connected embodiment is shown with a storage capacitor 101'.

The storage capacitor 101 provides additional capacitance and charge to the switched voltage terminal thereby reducing the effects of kickback, reducing the effects on the voltage of leakage of charge from the switched voltage terminal and reduces the switched voltage required to change the color or grey scale of the pixel. Connecting the storage capacitor terminal to the direct voltage terminal provides a storage capacitor without adding another terminal to the pixels of the display apparatus 100, 150 and its switching circuit 9, thus minimizing the number of circuit lines in the matrix circuit board and the number of terminals to the driver 5.

Inversion Scheme

In one embodiment of the display apparatus according to the present invention, the driver is configured to provide driving signals that invert the polarity of the supply voltage across the pixel cell at regular time intervals, so as to obtain an average voltage being essentially zero with no directional build-up of charges in the pixel cell.

In principle, the transmission characteristics of a pixel are independent of the direction of the electric field across the cell, i.e. the polarity of the electric field. However, during a period of several frame times a build-up of a biasing charge may occur, resulting in a biasing electric field across the cell. Such a biasing electric field is not desirable since it may change the transmission characteristics of the cell and can lead to so-called image sticking or after image and eventually to non-reversible degradation of the pixel cells in the display, collectively called image artifacts. To overcome this build-up of a biasing electric field, the polarity of the electric field across the pixel cells is inverted at regular intervals, typically every frame time, defining a so-called polarity inversion scheme. This scheme results in the long term average of the electric field being essentially zero with no biasing build-up of charges in the cell.

In general, the common electrode only has one connection to the driver for all pixels, which has a manufacturing advantage. In order to apply inversion schemes, the voltages of all electrodes except the row electrodes are preferably to be inverted with respect to the voltage on the common electrode, as inversion on the common electrode may result in incorrect pixel color transitions when pixel cell terminals are controlled row at a time. Inversion of the common electrode voltage may affect all the pixels in the panel at the same moment which may therefore introduce incorrect pixel color transitions. Preferably, inversion is applied per row addressing cycle: every row of pixels will be inverted at the right moment, just before the line selection time of the pixel in that row.

As an example when the common or top electrode of a pixel is set to 20V and the range of column voltages is 0V up to 20V, the inverted range of column voltages is 20V up to 40V thereby increasing the total range or swing on the column electrodes by a factor of two. When for example a thin film transistor is used as the active element the voltage on the row electrode must be smaller than the lowest column and switched voltages and larger than the largest column and switched voltages, resulting in a much increased voltage swing on the row electrodes as well. The optimal condition to apply an inversion driving method is that the inversion driving method does not add to the total swing of the voltages on the electrodes compared to a driving method without inversion. This can be reached when the driving method uses a common electrode voltage that is close to zero combined with a substantially symmetrical voltage around the common electrode voltage for all electrodes except the row electrode as then the voltage swing does not substantially increase by applying an inversion driving method.

When applying inversion to the standard driving methods of FIG. 5 and FIG. 7 the voltage range on the other electrodes is substantially increased when they are inverted with respect to the voltage level on the common electrode. They are therefore not ideally suited for an inversion scheme.

The 2-phase driving methods of FIG. 8 and FIG. 9 however are close to the optimal condition for an inversion driving method as discussed above and therefore enable the use of the inversion driving method for the EFC pixel cells. The common electrode voltage is substantially zero volt and the voltage levels on the other electrodes are almost symmetrical around the common electrode voltage. Especially the symmetry around the common voltage of the column electrode voltage is important because this determines the row electrode voltage and thereby the voltage levels applied to the active element in the switching circuit, for example a thin film transistor. A low voltage operation on the active element enables the use of a lower cost driver and reduces the power consumption of the display apparatus.

Inversion driving methods can be applied in the multiphase, e.g. 2-phase, driving methods, as inversion of all voltages except the row electrode voltages does not lead to a significant increase in the voltages required to address the pixel and thus the display.

Barriers

In another embodiment of the display apparatus according to the present invention, the pixel cell may further comprise polar fluid front movement barriers. These barriers may be provided by physical structures locally influencing an applied electric field to the channel surface having a wetting property, by physical structures locally influencing the wetting property or by physical structures locally influencing the radius of curvature and thus the Young-Laplace pressure of the polar liquid in the channel. These barriers may also include a change in the chemical composition at the surface which has strong influence on the wetting properties.

The first type of structures may be provided by layers of different dielectric behavior, for example, by locally providing barrier structures of a differing dielectric constant or layer thickness. In addition or alternatively, these type of structures may comprise electrode structures defining a local varying electric field, for example, by providing holes, gaps or clearances in the structures reducing the local field strength. An electrode provided in or near the channel surface can accordingly be tuned to locally decrease or increase the electric field, to which the channel surface wetting property is responsive, which will result in barrier behavior for the movement of the polar fluid front. In addition to varying the electrode structures, the wetting property itself may be designed, for example by locally increasing or decreasing the wetting property of the channel surface, for example by redesign of the fluoropolymer, including chemical or physical modifications. It is also possible to locally change the Young-Laplace pressure of the polar liquid by changing the channel height. This can be done for instance by a local increase or decrease of layer thicknesses, such as the electrode layer thickness, the fluoropolymer layer thickness or the thickness of the additional insulator layers, where the latter two measures will also locally influence the applied electric field.

In the above, multiphase driving has been discussed, wherein a new color state of the pixel is reached via 'to white' or via 'to black' phases. A barrier is an additional 'stable', 'faultless' state between the completely white and the completely black states, through which a new pixel color may be reached without a cumulative transition error. Furthermore, barrier structures may be also used to locally 'hold' the polar fluid front in a particular position, thus locally reducing the stable voltage for holding the polar fluid front at the position of a barrier.

As herein disclosed, for a to-black transition the pixel capacitance C increases during and after applying the switched voltage on the pixel cell during the line time, as long as the amount of water in the channel increases. As the charge Q on the pixel is substantially retained during the phase spacing or the hold time, V will decrease until the Young-Laplace force and the electromechanical force are balanced. A substantial local decrease of the electromechanical force, of the voltage difference or a local increase of the radius of curvature of the polar liquid front may bring the water front to a standstill at an accurately determined position, or opposite in case of a 'to white' transition.

When a channel surface electrode has a reduced density locally, e.g. two times less because holes are provided in the electrode, for instance holes with a size of 5×5 micrometer, the electromechanical force is about twice as low. To pass the 'to black' barriers, a higher voltage may be used. This alternative seems to be preferred because it may be realized by simply adapting the geometrical layout of the channel surface electrode and hence there are no additional processing steps involved.

The described barrier implementations only concern a 'to-black' transition; a 'to-white' transition is oppositely influenced by a reduced electrode density as the speed at which the polar liquid retracts is locally and thus temporarily enhanced by a 'to black' barrier. A barrier for a 'to-white' transition may be realized by locally increasing the electrode density, e.g. by providing holes over the whole electrode, except locally at the barrier or by locally decreasing the radius of curvature of the polar liquid front.

Another possibility to realize a barrier is to locally roughen the fluoropolymer. This changes the wetting hysteresis of the fluoropolymer and thus the relation between the speed of the polar liquid front and the applied voltage to the channel surface electrode. A local decrease of the speed at a certain voltage can act as a 'to black' barrier; a local increase as a 'to white' barrier, where a positive speed means movement of the front towards the full black state.

The use of barriers may result in a more stable image with a higher contrast compared to a transition using a conventional multiphase, e.g. two-phase, driving method with a reset state. A pixel does not need to go to the next color state via the completely black state or via the completely white state in order to eliminate the accumulation of transition errors, but may go to the next display property via an intermediate state defined by a barrier that may be closer to the next pixel color or closer to the previous pixel color. The intermediate state functions as a reset state. The resulting image may be more stable for the viewer as the transition from the previous to the next color of the pixels will in general be faster when intermediate states defined by a barrier are used and the intermediate pixel color will be closer to the previous or the next color state of the pixel thereby eliminating possible flicker for the viewer. The use of additional reset states may also improve the contrast of the display as switching to an intermediate completely black reset state reduces the peak whiteness of the display while switching to an intermediate completely white reset state reduces the black level that can be achieved. It may be clear that the barrier structures as herein disclosed may be provided separately or in conjunction with the additional pixel cell terminal driven to bring the pixel cell into an intermediate condition.

While the fluid movement barriers may function independent of the intermediate condition as herein described, preferably, the driver is configured to stabilize the polar fluid front at the position of a polar fluid front movement barrier when changing the pixel cell intermediate condition.

FIG. 11A shows a schematic representation of a display apparatus 1100 with switching circuit 9 containing a charge pump 1101 per pixel that is connected to the switched voltage terminal 10 of pixel cell 2. The charge pump has at least one additional terminal, the charge pump addressing terminal 1103 that is connected to additional circuitry in the switching circuit that is connected to the driver 5. The voltage supplied to the charge pump addressing terminal determines the current supplied by the charge pump. The charge pump is also connected to a continuously charging voltage source electrode 1102, also referred to as the voltage rail, that can supply more than one voltage level and that may be connected to the driver with one common connection for all pixels or with one connection per row of pixels. The charge pump can supply a continuously charged and therefore substantially constant switched voltage to the pixel cell during a pixel color transition. This is especially beneficial when the pixel capacitance increases during the pixel color transition due to water flowing into the channel, e.g. the to-black transition, as the charge pump buffers the voltage on the charge pump addressing terminal. Due to the buffering the voltage on the charge pump addressing terminal does not substantially decrease with increasing pixel capacitance making it possible to address the charge pump with lower row and column electrode voltages compared to the driving methods used of FIG. 5 and FIG. 7 at the cost of an additional charge pump per pixel. On top of that, the substantially constant switched voltage results in a substantially constant switching speed that cannot be achieve when using a pixel switch as shown for example in FIG. 4B and FIG. 6B, as the switched voltage will change towards the stable voltage between the line selection times in that case which may result in a decreasing switching speed. The additional circuitry in the switching circuit for addressing the charge pump can have row and column electrodes to set the voltage on the charge pump addressing terminal, but it is also possible that more or less electrodes are used depending on the implementation of that part of the switching circuit and the implementation of the charge pump. The pixel cell contains a further pixel cell terminal 4 that is connected to a further electrode that supplies a direct voltage to the pixel cell. The further electrode can be connected to the driver as indicated by 3 in FIG. 1B.

The charge pump can be implemented by use of a thin film transistor as shown in FIG. 11B, although implementations with more than one TFT, current mirrors or multiple concatenated buffer stages are also possible. It shows an addressing TFT 1104 being connected to the charge pump addressing terminal 1103 of charge pump 1101. The charge pump contains a power TFT 1105 that is connected to the charge pump addressing terminal at its gate terminal and the switched voltage terminal 10 and the voltage rail 1102 on its source and drain terminals. The charge pump addressing terminal 1103 is charged to a voltage that sets the resistance of the channel of the power TFT and thereby the current that can run through the channel. The pixel capacitance may change when the supply voltage is substantially different than the stable voltage. The combination of the rate of change of the pixel capacitance and the resistance of the channel of the power TFT determines switched voltage. When the current is high enough the switched voltage may be substantially the same as the voltage on the voltage rail, while at a low current the voltage may be substantially the same as the stable voltage. The bottom channel electrode 1106 is connected to the direct voltage terminal 4.

Alternatively, it is also possible to connect the power TFT 1102 to the bottom channel electrode 1106. The water electrode is then connected to the direct voltage terminal. This is analogous to the water directly connected scheme of FIG. 6.

Figure 11:
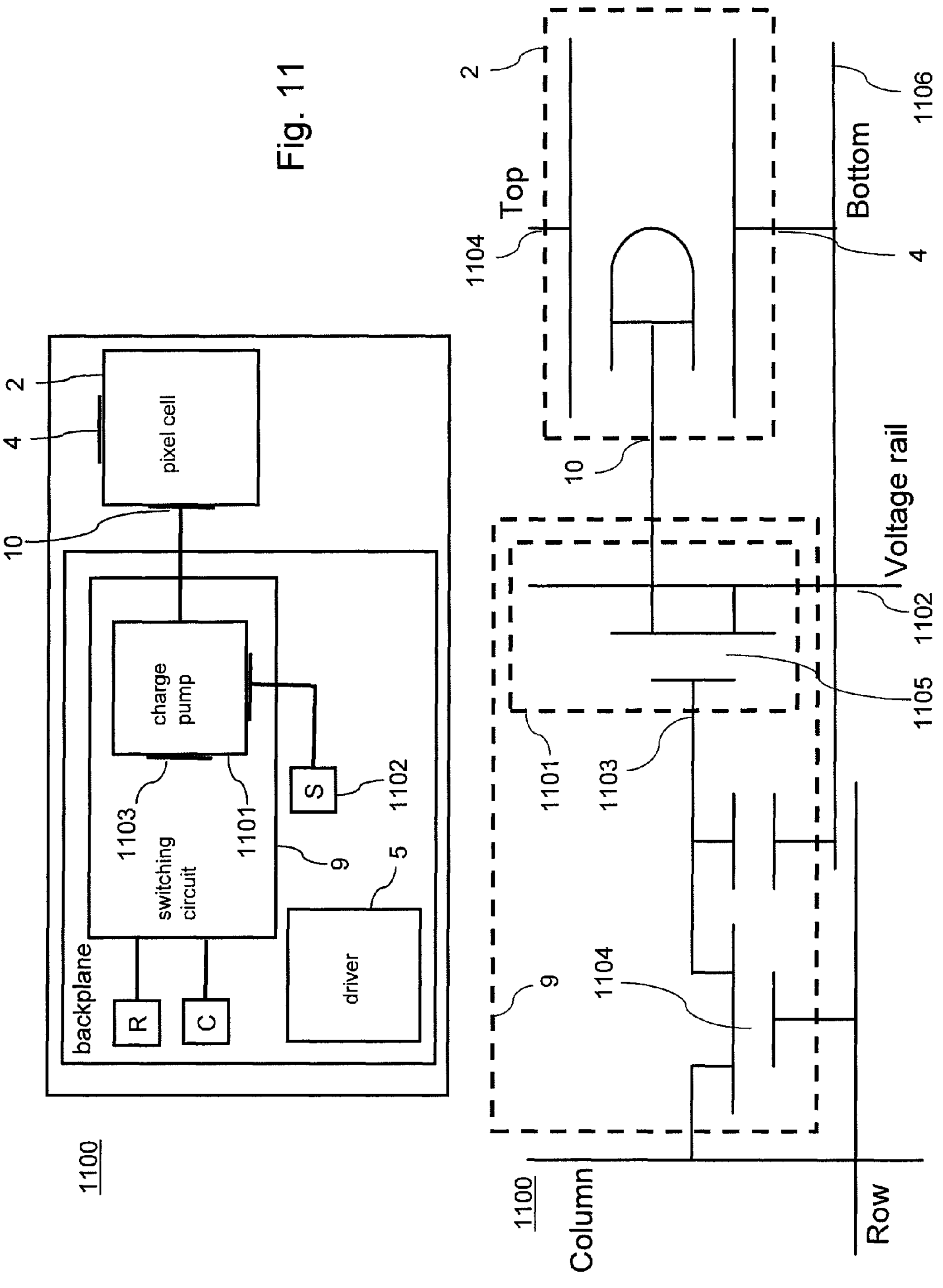
FIG. 11: is a schematic representation of a continuously charged switching circuit.
Figure 12:
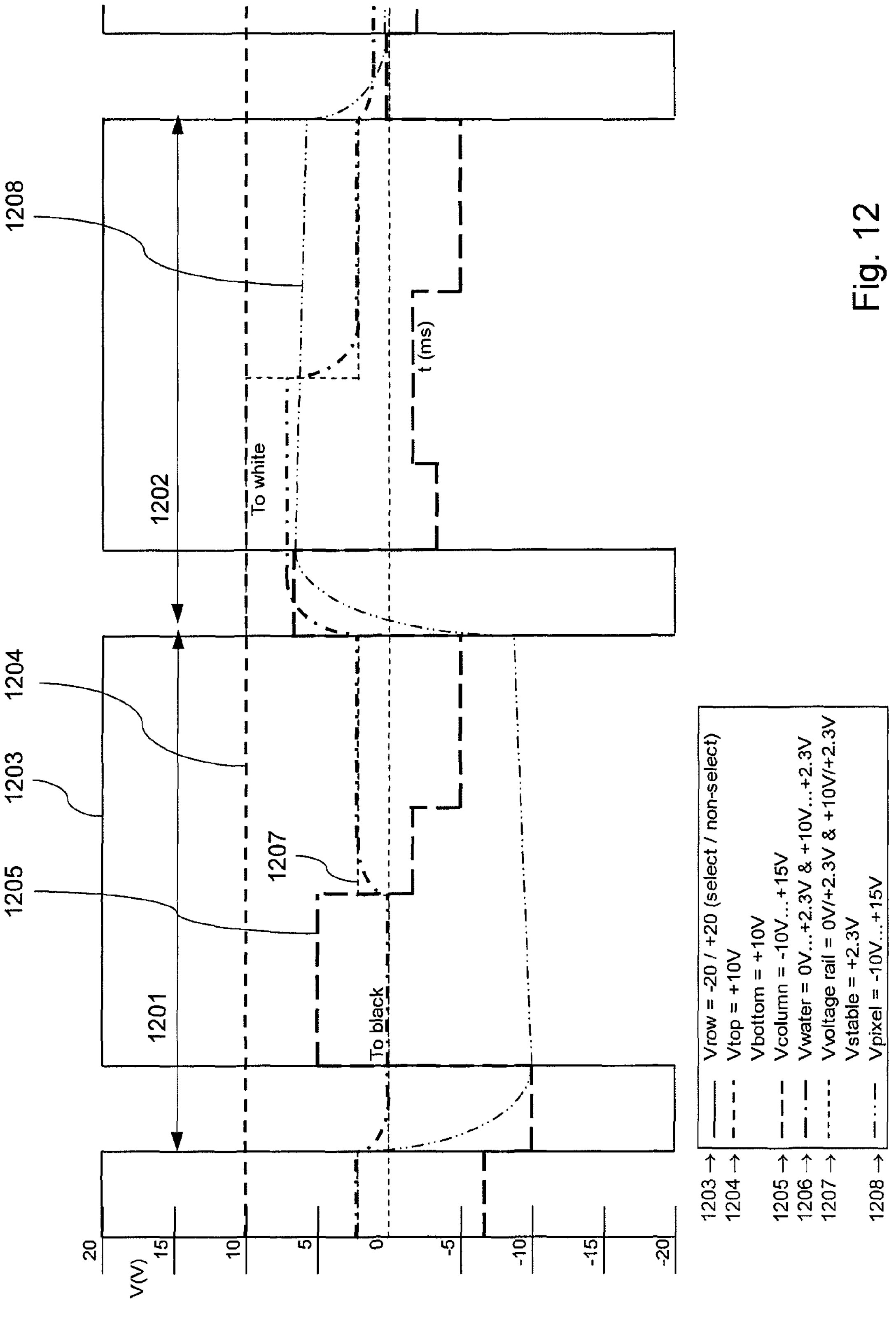
FIG. 12: is a driving method with voltage rail per row for a continuously charged switching circuit.

FIG. 12 shows a driving method implementing a 'to black' phase 1201 and a 'to-white' phase 1202 with a voltage rail per row for a continuously charged circuit. It shows a driving method using the pixel schematic of FIG. 11. In the 1st phase 1201 charge pump addressing terminal 1103 is supplied with a negative voltage that determines the channel conductivity of the power TFT 1102 that is a p-channel TFT in this example (for an n-channel TFT the select and non-select voltage levels are inverse and a positive voltage on the pixel electrode is required for inducing the same channel conductivity). The voltage on the charge pump addressing terminal is indicated by line 1208. The charge pump addressing terminal voltage is determined by the row and column electrode voltages indicated by lines 1203 and 1205 respectively that are connected to the terminal through the addressing TFT 1104. As the voltage rail, indicated by line 1207, is at 0V while the top and bottom channel electrodes, indicated by line 1204, are at 10V the pixel switches to black. At the end of a certain phase part in the first phase the voltage rail 1207 is set to the stable voltage, thereby stopping movement of the water front in the pixel cell. In order to do this without creating transition errors the voltage rail is operated row-at-a-time. Alternatively, the timing between the first phase 1201 and the second phase 1202 can be chosen such that the voltage rail does not need to be switched to the stable voltage during the $1^{st}$ phase 1201. The phase spacing can be smaller than the frame time or as long as a number of frame times. At the start of the 2nd phase 1202 the voltage rail is switched (row-at-a-time) to +10V. By charging the charge pump addressing terminal to 7V, the channel resistance of the power TFT is programmed such that the resulting switched voltage on the water electrode is between the stable voltage and the voltage on the voltage rail, resulting in a slow switching to white, i.e. the water in the channel slowly retracts into the reservoir. This voltage is substantially constant as long as the voltage rail is kept at 10V, as the voltage rail continuously charges the pixel electrode. At the end of a certain phase part in the second phase, the voltage rail can again be reset (row-at-a-time) to the stable voltage. This is preferred in the hold period, as the hold period is typically the majority of the total frame time, while the new pixel color should preferably be reached in a time that is short compared to the frame time in order to enable video content on the display, although for slower switching systems the phases can be longer than a frame time.

In this embodiment it is also possible to configure the driver to supply a direct voltage to the pixel cell that sets the intermediate condition. The direct voltage is supplied to the bottom electrode 1106 that is connected to a further electrode that is parallel to the row electrodes and has a connection to the driver per row of pixels. This creates a voltage difference between the top and the bottom electrodes both indicated by line 1204 during the first 'to black' phase thus generating a certain minimum electromechanical force in the channel through the basic supply voltage that may reduce the voltage levels needed to address the addressing TFT. Preferably the voltage difference between the top and the bottom electrodes is chosen such that only the 'stable' and 'to black' transitions between pixel colors are possible, as that minimizes the voltage levels needed on the water electrode during this phase.

During the second 'to white' phase 1202 the bottom electrode is supplied with another direct voltage. The top electrode, being a common electrode for all pixels, is preferably set to a voltage close to or equal to 0V to get to the minimum absolute voltage level on the other electrodes and to enable inversion schemes without a substantial increase of the voltage levels on the electrodes.

The voltage levels, e.g. the voltages required on the row and column electrodes, needed to drive the pixel cell according to this embodiment can be lowered when using a direct voltage to set the intermediate condition of the pixel cell. This improves lifetime of the display apparatus and its switching circuit, makes it possible to use low voltage components in the driver and conserves power.

For example, the bottom electrode can be charged to 12.6V during the 'to black' phase and −8.9V during the 'to white' phase. The voltage rail is then switched between −1.8V and 1.9V during both phases, while the stable voltage is 1.9V during both phases. This reduces the voltage swing supplied to the charge pump addressing terminal to −10V up to 7V and this then in turn reduces the non-select voltage level on the row electrode to 12V instead of 20V as used in FIG. 12. As the top electrode is substantially at 0V or the kickback voltage it is possible to apply inversion schemes without a substantial increase in the voltage levels on the switching circuit and the driver.

It is also possible to apply the direct voltage to the water electrode when the water electrode is connected to the direct voltage terminal while the bottom electrode is connected to the charge pump addressing terminal.

Figure 13:
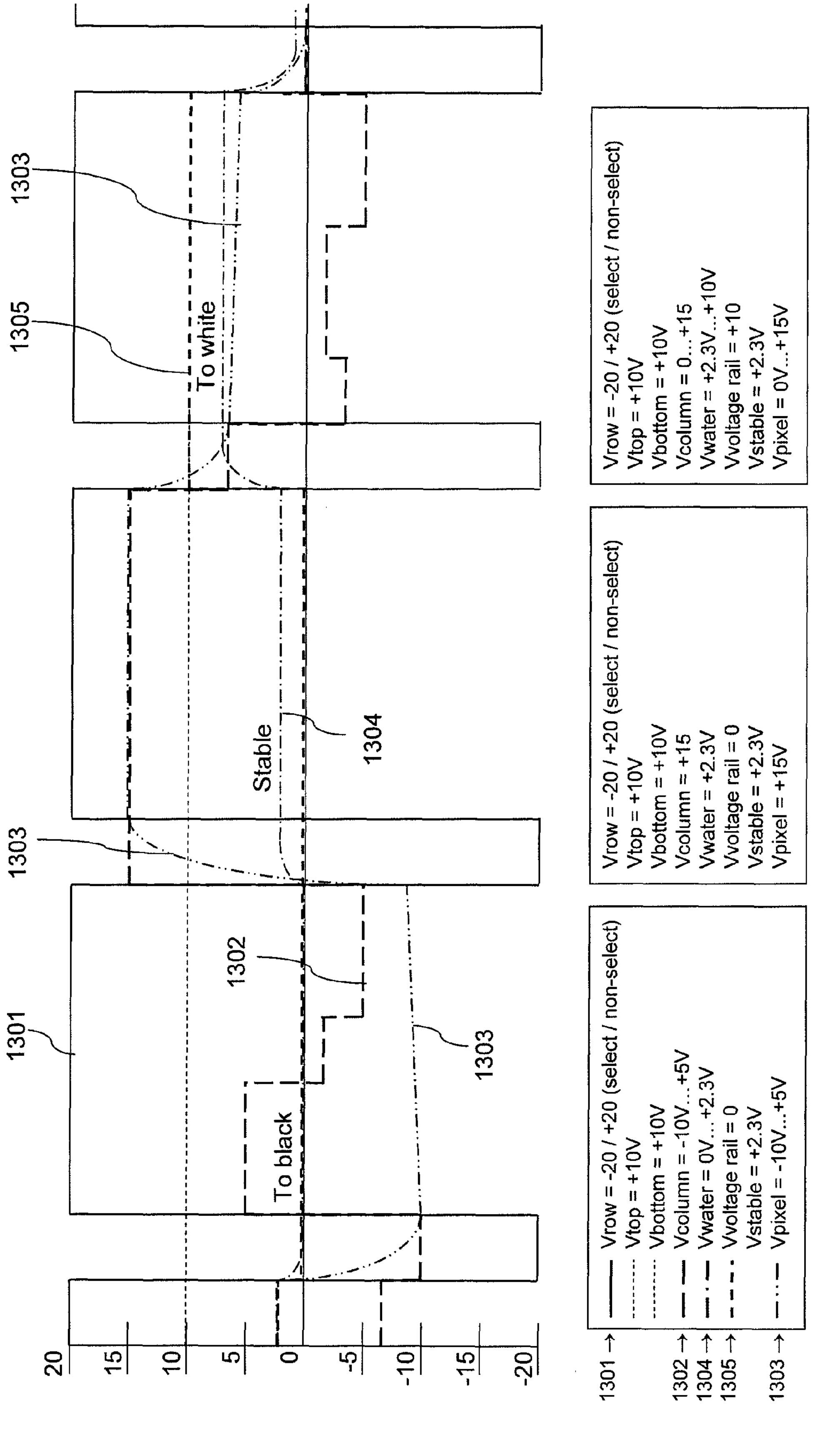
FIG. 13: is a driving method with common voltage rail for a continuously charged switching circuit.

FIG. 13 shows a driving method for the circuit of FIG. 11 consisting of a separate to-black and to-white phases with a third intermediate phase in between. When using this driving method the circuit can have a common voltage rail, i.e. one common voltage rail 1305 for all pixels in the display, for a display apparatus 1100 with a switching circuit containing a charge pump per pixel. It shows a driving method using the pixel schematic of FIG. 11. It is possible to use one common voltage rail for all pixels in the display when the update speed is not critical or when using very high frame rates, i.e. a very short frame time compared to the switching speed of the pixel cells. This has the advantage that it reduces the complexity of the driver as it has only one connection to the voltage rail for all pixels in the display. The 'to black' and 'to white' phases are identical to FIG. 12, but the change of the voltage on the common voltage rail is only applied when the voltage on the switched voltage terminal of all pixel cells in the display are reset to the stable voltage in an additional intermediate phase, preferably during a single frame time. This is done by supplying the charge pump addressing terminal with +15V, which increases the resistance of the power TFT to a very high level (for a p-type power TFT) thereby effectively isolating the switched voltage terminal from the voltage rail. The water front will stop moving when the voltage on the water electrode is substantially equal to the stable voltage. As the switched voltage terminal is effectively isolated from the voltage rail it is possible to switch the voltage rail to another voltage level when all pixels have been addressed in the intermediate phase. This scheme requires at least three phase phases for one update; wherein a phase may comprise several phase parts wherein the charge pump is selectively switched to stop the moving of the water front.

In this embodiment it is also possible to configure the driver to supply a direct voltage to the pixel cell that sets the intermediate condition similar to the use of the intermediate condition in the embodiment of FIG. 12. The direct voltage is again supplied to the bottom electrode 1105 that is connected to a further electrode that has one common connection to the driver for all pixels in the display apparatus. This creates a voltage difference between the top and the bottom electrodes both indicated by line 1204 during the first 'to black' phase thus generating a certain minimum electromechanical force in the channel by the basic supply voltage that reduces the voltage levels needed to address the addressing TFT. It is also possible to apply the direct voltage to the water electrode when the water electrode is connected to the direct voltage terminal.

Figure 14A:
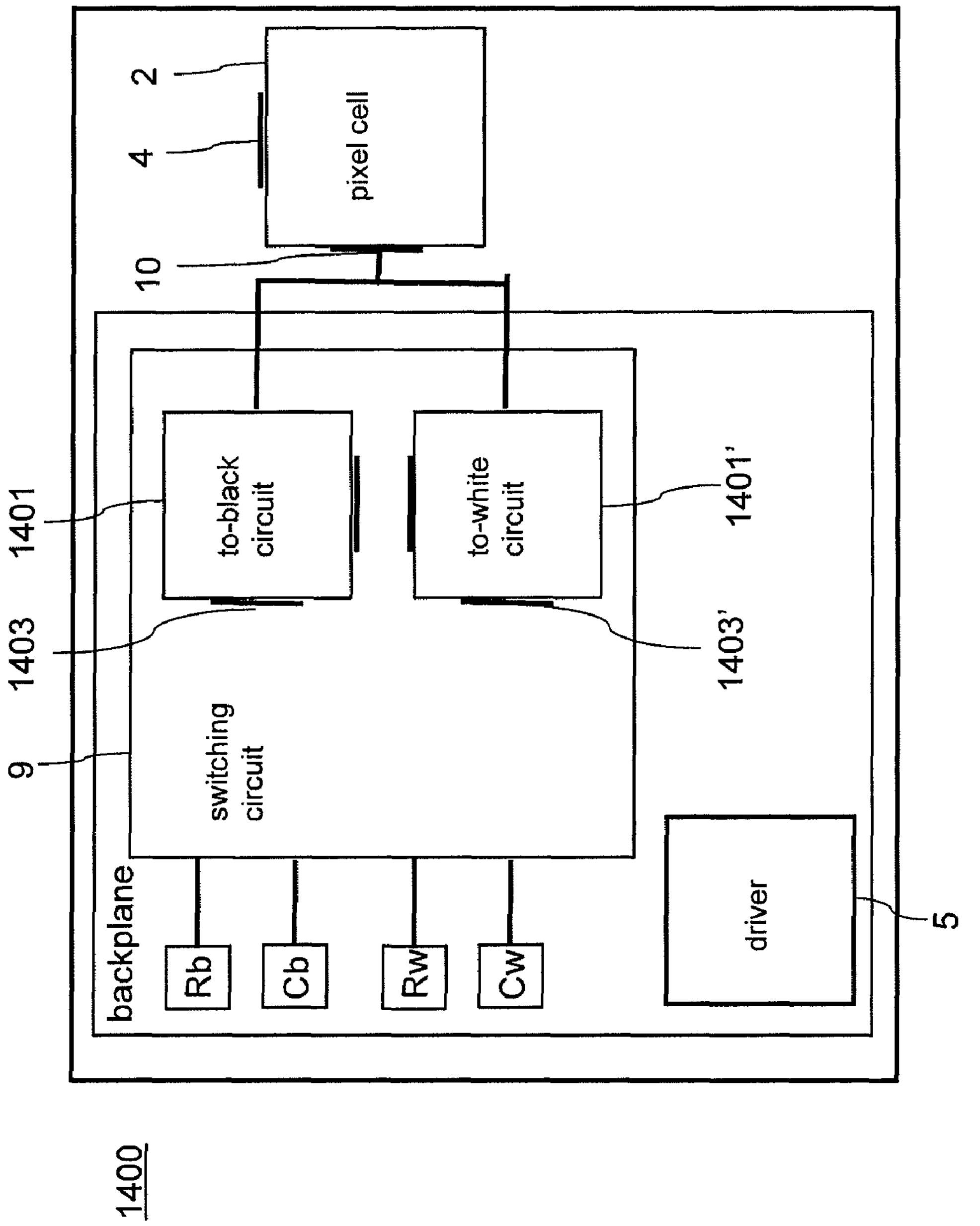

FIG. 14A shows a schematic representation of a display apparatus 1400 with switching circuit 9 that contains separate circuits for to-white transitions 1401', a so-called to-white circuit 1401', and for to-black transitions 1401, a so-called to-black circuit. The to-white circuit 1401' may be used for to-white transitions of the pixel 2, while the to-black circuit 1401 may be used for to-black transitions of the pixel. Both circuits can for example be implemented by a switching circuit that charges the switched voltage to the level of a column electrode or by a circuit comprising a charge pump. The two circuits have at least one terminal 1403, 1403' that connects the circuits to the rest of the switching circuit and at least one terminal that connect the circuits to the switched voltage terminal 10 of the pixel cell. The switching circuit may have separate row and column electrodes for the to-black and the to-white circuits that are connected to a driver 5, but it is also possible that electrodes are shared between the to-black and to-white circuits or that more or less addressing electrodes are required. It is also possible that additional electrodes are required, such as voltage rails. The switching circuit is connected to the switched voltage terminal 10 of the pixel cell.

The advantage of separate circuits for the to-white and to-black transitions of the pixel is that the two circuits may be implemented in a straightforward manner. For example when the to-black circuit contains a charge pump, while the to-white circuit is a simple voltage addressable structure, the charge pump only requires one common voltage rail for all pixels in the display that may only supply one voltage level. The to-black transition is then continuously charged which is advantageous because the pixel capacitance increases during the to-black transition, while the to-white transition is simply addressed by a switched voltage. Of course it is also possible to use other implementations for the two circuits.

FIG. 14B shows an example of a schematic of the switching circuit 9 by use of thin film transistors. The to-black circuit 1401 is a charge pump containing a power TFT 1405 that is connected to the charge pump addressing terminal 1403 at its gate terminal and the switched voltage terminal 10 and the voltage rail 1402 on its source and drain terminals. The to-white circuit 1401' only contains an electrode that connects the rest of the switching circuit to the switched voltage terminal 10. The switching circuit contains two addressing TFTs 1404, 1404' that are connected to the terminals of the to-black and the to-white circuits, respectively. The switching circuit is connected to the driver by four terminals; the column-white electrode 1406, the row-white electrode 1407, both used to address the to-white circuit and the column-black electrode 1406' and the row-black electrode 1407', both used to address the to-black circuit.

The to-white circuit is used to reset the switched voltage terminal 10 to a certain voltage level enabling the charge pump of the to-black circuit to be connected to a voltage rail that only supplies one voltage level and only has one common connection to the driver for all pixels in the display, while still having the possibility of a high update speed for the pixels. Typically, preferably the switched voltage terminal 10 is reset when the charge pump is closed, where closed means that the charge pump has effectively isolated the switched voltage terminal from the voltage rail 1402. Although resetting the switched voltage terminal to a certain voltage level via the to-white circuit is most beneficial when the pixel is switched to white, i.e. when the pixel capacitance decreases during the pixel color transition due to water flowing out of the channel into the reservoir, as the to-white structure can then reset the switched voltage terminal to the correct voltage to enable the pixel color transition without the need for continuous charging, it is also possible to induce to-black transitions by use of the to-white circuit, especially for small changes towards black. The charge pump of the to-black circuit can also be used for to-white transitions, although it will be most beneficial when only used for to-black transitions as it enables the use of one common voltage rail supplying only one voltage.

The driving method is similar to FIG. 12. During a $1^{st}$ phase, a so-called 'to black' phase, the to-white addressing TFT is closed (the channel resistance is high) and the pixels are driven to black by use of the charge pump, while during a $2^{nd}$ phase, a so-called 'to white' phase, the charge pump is closed and the pixels are driven to white by charging the switched voltage terminal to a certain reset voltage supplied by the 'column-white' electrode. Of course it is also possible to interchange the 2 phases in time.

In this embodiment it is also possible to configure the driver to supply a direct voltage to the pixel cell that sets the intermediate condition. The direct voltage is supplied to the bottom electrode 1408 that is connected to a further electrode that is parallel to the row electrodes and has a connection to the driver per row of pixels. This can lower the voltages on the electrodes, including the switching circuit and the driver substantially by applying suitable intermediate conditions during the phases, for example a voltage difference between the top and the bottom electrode during the 'to black' phase. Accordingly, the switching circuit comprises a first circuit 1401' for supplying a switched voltage that moves the polar fluid out of the channel and a second circuit 1401 for supplying a switched voltage that moves the polar fluid into the channel.

Figure 15:
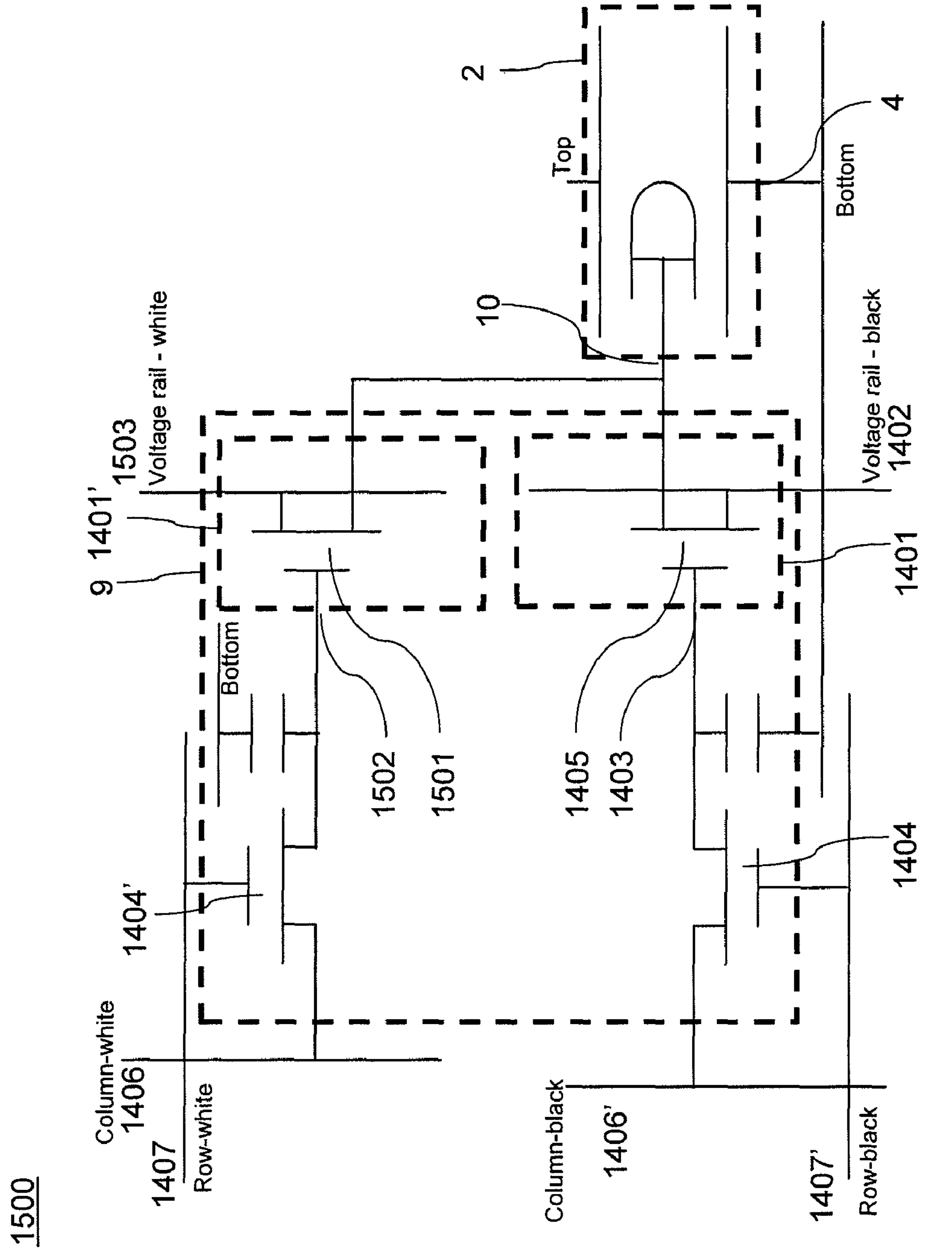
FIG. 15: depicts a double circuit for a continuously charged switching circuit.

FIG. 15 shows a display apparatus 1500 having a switching circuit according to the schematic shown in FIG. 14A containing a charge pump for the to-white and the to-black circuits using thin film transistors. The to-white circuit contains a power TFT 1501 that is connected to the charge pump addressing terminal 1502 at its gate terminal and the switched voltage terminal 10 and the voltage rail—white 1503 on its source and drain terminals. The driving method is again a 2 phase driving method where during the $1^{st}$ phase the 'to black' transition is addressed by the to-black circuit 1401, while the power TFT of the to-white circuit 1501 is set to a high channel resistance and during the $2^{nd}$ phase the 'to white' transition is addressed by the to-white circuit 1402', while the power TFT of the to-black circuit 1405 is set to a high channel resistance. Again it is possible to interchange the 'to black' and the 'to white' phases in time. Care has to be taken that only one of the two power TFT's is set to a low channel resistance state at one point in time, as otherwise the power consumption of the pixel will be very high and the circuitry of the active-matrix circuit board and the driver can be damaged.

The advantage of this embodiment is that both during the to-white and the to-black transitions the switched voltage is substantially constant, resulting in a substantially constant switching speed. The voltages required on the voltage rails can be constant and each voltage rail can be connected to the driver with one connection for all pixels.

In this embodiment it is also possible to configure the driver to supply a direct voltage to the pixel cell that sets the intermediate condition. The direct voltage is supplied to the bottom electrode that is connected to a further electrode that is parallel to the row electrodes and has a connection to the driver per row of pixels. This can lower the voltages on the electrodes, including the switching circuit and the driver, substantially by applying suitable intermediate conditions during the phases, for example a voltage difference between the top and the bottom electrode during the 'to black' phase.

Figure 16:
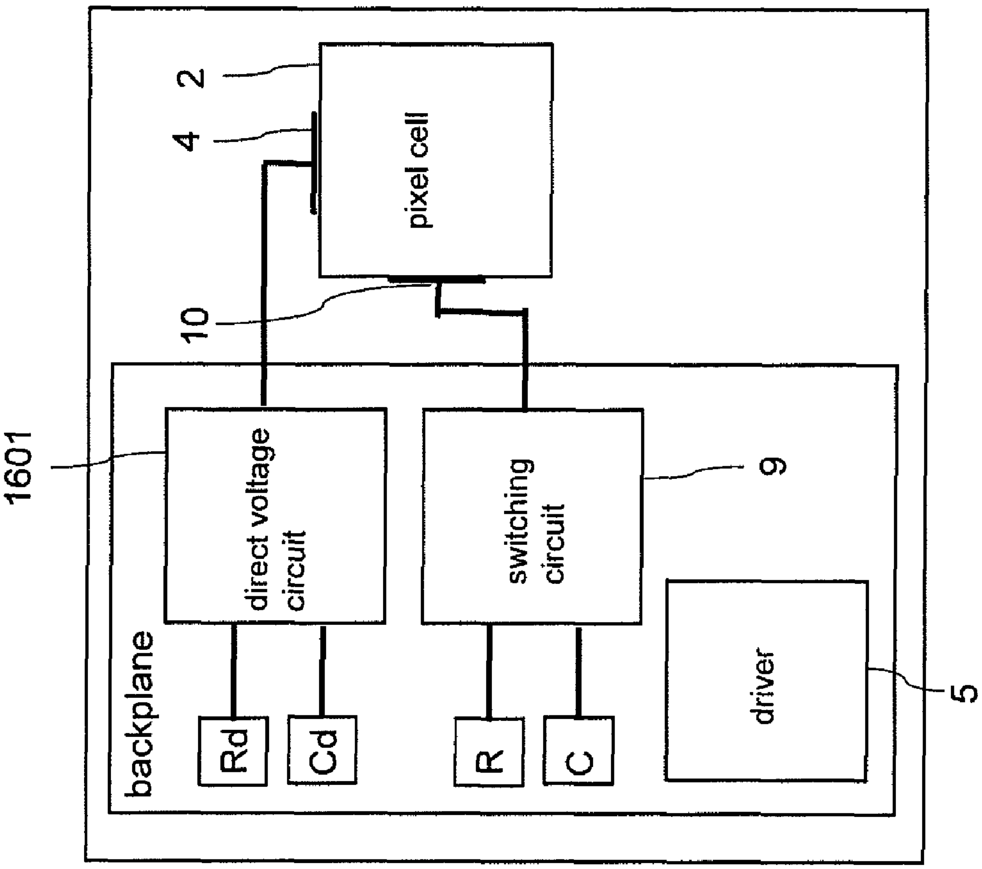
FIG. 16: depicts an addressable circuit on the direct terminal.

FIG. 16 shows a schematic representation of a display apparatus 1600 that contains a separate circuit 1601 per pixel to supply a direct voltage to the further terminal 4 of pixel cell 2. The direct voltage circuit 1601 can for example be implemented by a switching circuit that charges the further pixel cell terminal to the level of a column electrode or by a circuit comprising a charge pump. The direct voltage circuit may have separate row and column electrodes that are connected to a driver 5, but it is also possible that electrodes are shared between the switching circuit and the direct voltage circuit or that more or less addressing electrodes are required. It is also possible that additional electrodes are required, such as voltage rails.

The advantage of a direct voltage circuit per pixel is that the direct voltage terminal may be used set the intermediate condition of pixel cell 2 specifically for the pixel color transition. Without a direct voltage circuit the intermediate condition can only be set by a direct voltage that is common for a group of pixels, for example a row of pixels or a column of pixels, regardless of their specific color transition. With the direct voltage circuit the combination of the specific direct voltage and switched voltage for a pixel color transition may result in an additional reduction of the voltages required on the circuits, the electrodes between the circuits and the driver 5 and in the driver itself The direct voltage circuit may also result in a higher switching speed, as it enables the selection of the intermediate condition and thereby selection of the 'to white' and the 'to black' phase per pixel, depending on their specific color transition alternatively or in addition to having multiple phases sequentially in time.

As an example, the direct voltage circuit may be implemented by a charge pump. The charge pump can supply a substantially constant direct voltage to the further pixel cell terminal 4 that sets the intermediate condition. When the next pixel color can be reached by switching to black the intermediate 'to black' condition is set by the charge pump; when the next pixel color can be reached by switching to white the intermediate 'to white' condition is set by the charge pump. In effect, for example, the phases 81, 82 and 91, 92 of the multiphase driving methods of FIG. 8 and FIG. 9 respectively may now be selected per pixel depending on the specific pixel color transition. This can reduce a multiphase driving method to a driving method that has only one phase in length, where multiple phases can be selected during that time by the direct voltage circuit.

On the other hand, the direct voltage circuit may also be used to set the intermediate condition specifically for each pixel during each sequential phase of a multiphase driving method. For example, during a 'to black' phase a pixel than only needs to be switched to black by a small amount can receive a lower basic supply voltage than a pixel than needs to be switched to black by a larger amount. This may result in a substantial lower voltage swing on the column electrodes of the display apparatus during a multiphase driving method.

FIG. 17 shows a bi-stable embodiment 1700 of the apparatus according to the present invention, wherein the channel surface 1701 wetting property is arranged to stabilize the polar fluid front in absence of a supply voltage; and wherein a reservoir electrode 1702 is arranged to move the polar fluid out of the channel and into the reservoir. This is the so-called bi-stable embodiment. The water front in the channel keeps its position at 0V, due to surface treatment of the fluoropolymer on the channel surface, surface tensions of the liquids, or geometrically varying capillaries that are converging or diverging, to name a few options. Alternative stabilization methods are also possible. Pulling the water back into the reservoir is done by an additional electrode 1702. In particular, preferably, as shown in FIG. 18*a* the switching circuit comprises a separate circuit 1802 for supplying a switched voltage that moves the polar fluid into of the channel and for supplying a voltage to the reservoir electrode 1702 that moves the polar fluid out of the channel.

Figure 18A:
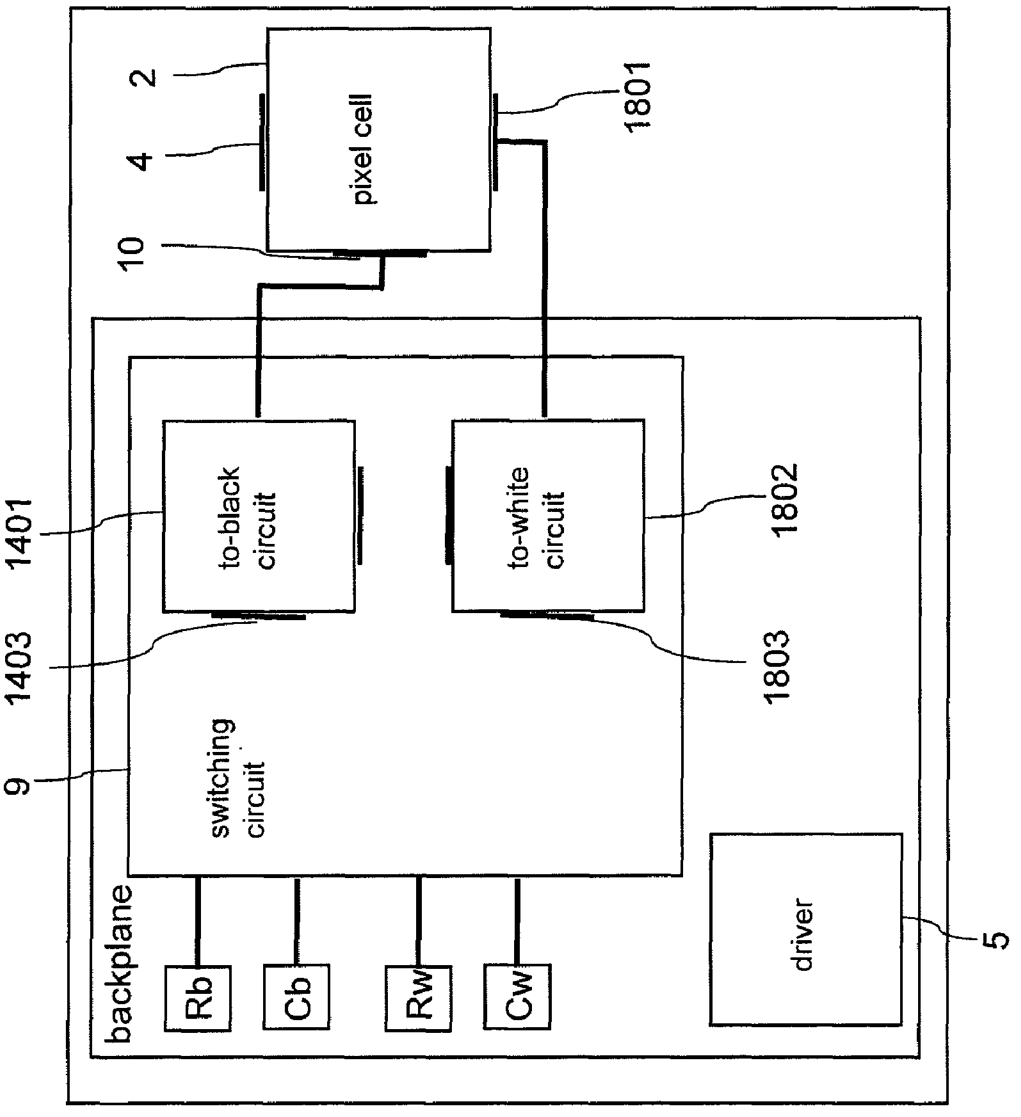

FIG. 18A shows a display apparatus 1800 with a switching circuit for bi-stable operation. The switching circuit 9 contains a separate circuit for to-white transitions 1802, the so-called to-white circuit, and for to-black transitions 1401, the so-called to-black circuit. The to-white circuit is used to supply a voltage to a further pixel cell terminal 1801 that is connected to the reservoir electrode 1702. The to-black circuit supplies a voltage to the switched voltage terminal 10 that is connected to the water electrode 40. The to-white circuit is used to supply a voltage to the reservoir electrode that moves the polar fluid out of the channel and into the reservoir; the to-black circuit is used to supply a switched voltage that moves the water into the channel. Both circuits can for example be implemented by a switching circuit that charges the switched voltage to the level of a column electrode or by a circuit comprising a charge pump. The two circuits have at least one additional terminal 1403, 1803 that connects the circuits to the rest of the switching circuit. The switching circuit may have separate row and column electrodes for the to-black and the to-white circuits that are connected to a driver 5, but it is also possible that electrodes are shared between the to-black and to-white circuits or that more or less addressing electrodes are required. It is also possible that additional electrodes are required, such as voltage rails.

FIG. 18B shows an example of a schematic of the switching circuit 9 by use of thin film transistors. The to-black circuit 1401 connects the addressing circuit of the switching circuit via terminal 1403 to the switched voltage terminal 10. The to-white circuit 1802 connects the addressing circuit of the switching circuit via terminal 1803 to the further pixel cell terminal 1801. The switching circuit contains two addressing TFTs 1804, 1804' that are connected to the terminals 1403, 1803 of the to-black and the to-white circuits, respectively. The switching circuit is connected to the driver by four terminals; the column-white electrode 1805, the row-white electrode 1806, both used to address the to-white circuit and the column-black electrode 1805' and the row-black electrode 1806', both used to address the to-black circuit. The to-black circuit and its addressing TFT circuit are identical to the 'bottom directly connected' configuration. The other configurations can be used for this part of the circuit as well, e.g. the 'water directly connected' configuration. When the top channel (43), bottom channel (41) and water (40) electrodes are at the same bias, sufficient bias to the 'to white' electrode 1702 will pull the water back into the reservoir 22. At equal bias the speed of retraction will be slower than the speed of filling the channel as the surface-to-volume ratio of the reservoir is much smaller than in the channel, resulting in a smaller electromechanical force.

Figure 19:
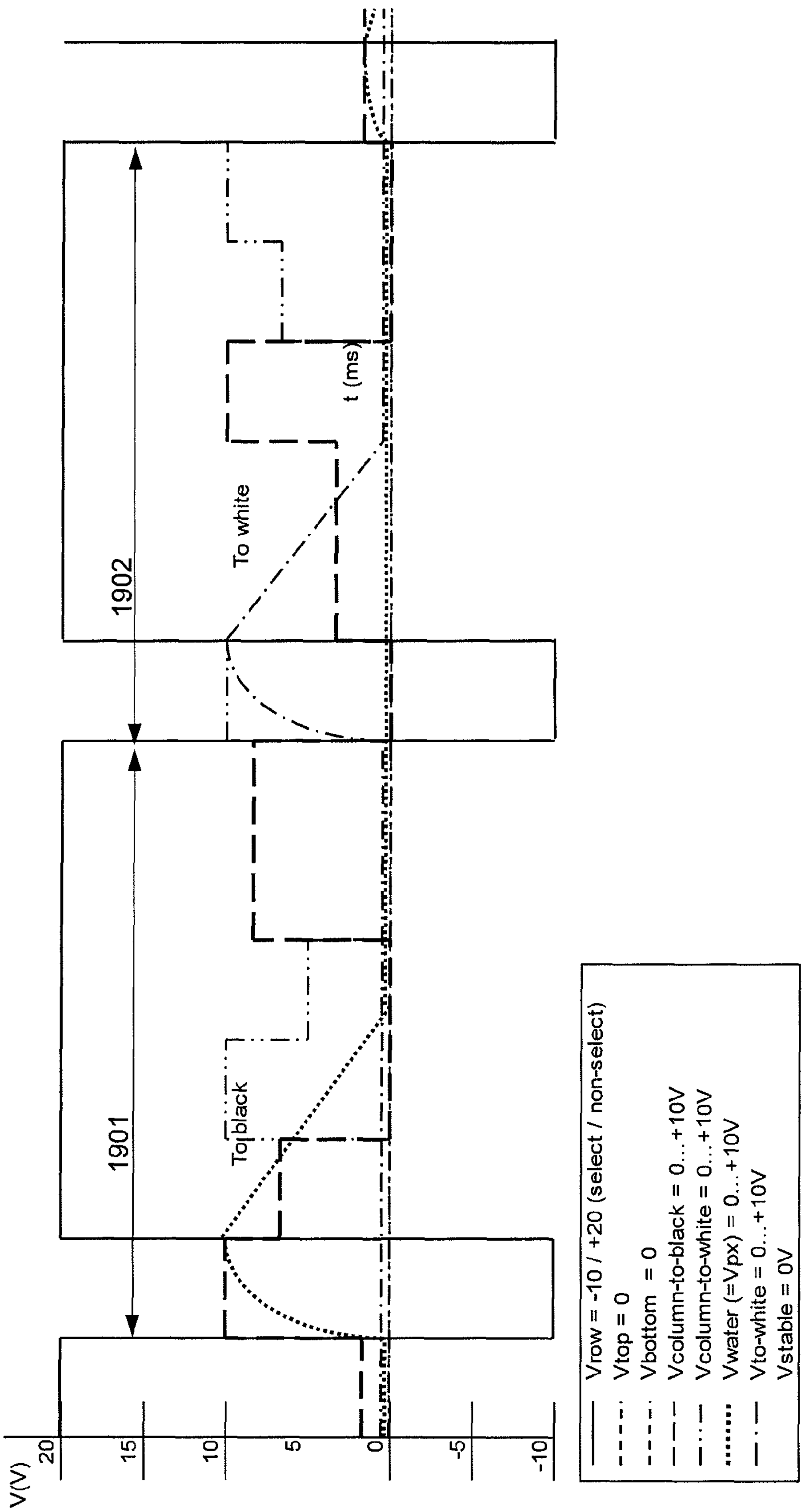
FIG. 19: depicts a driving method for bi-stable pixel circuit.

FIG. 19 shows a driving method for the bi-stable pixel circuit, based on the circuit 1800 shown in FIG. 18B. The first frame 1901 shows a pixel that is switched to black. The water electrode is charged to a positive voltage during the line selection time, while the top and bottom channel electrodes are kept at 0V. The 'to white' electrode is preferably charged to the same voltage as the water electrode in order to minimize the 'to white' bias between the water electrode and the 'to white' electrode when switching to black (not shown in FIG. 19). During the hold time the water electrode voltage decreases to the stable voltage when switching to the new color is completed. The second frame 1902 shows a pixel switching to white by biasing the 'to white' electrode 1702. The top channel, bottom channel and water electrodes are set to 0V, while the 'to white' electrode is set to a positive voltage (a negative voltage will have the same effect). To speed up the switching to white it is also possible to set the top channel (43), bottom channel (41) and water (40) electrodes all to the same negative voltage, thereby increasing the total bias between the 'to white' electrode and the water electrode while maintaining a zero electromechanical force in the channel. The same can be done for 'to black' switching by setting the top and bottom channel electrodes to an inverse bias compared to the water electrode.

In this embodiment it is also possible to configure the driver to supply a direct voltage to the pixel cell that sets the intermediate condition. The direct voltage is supplied to the bottom electrode. This can lower the voltages on the electrodes, including the switching circuit and the driver, substantially by applying suitable intermediate conditions during the phases, for example a voltage difference between the top and the bottom electrode during the 'to black' phase.

Without limitation, polar fluids may include ionized water preferably containing pigment chromophores; without limitation, non-polar fluids may include oil, preferably white or translucent oil. In an alternate embodiment the water contains white pigment and the oil a black dye. Without limitation, the channel surface having a wetting property responsive to an applied electromagnetic field comprises a fluoropolymer.

In the context of this description, the term continuously charged refers to charging of the pixel cell that is irrespective of its load state during a predetermined charging time. While certain embodiments detail certain optional features as further aspects of the invention, the description is meant to encompass and specifically disclose all combinations of these features unless specifically indicated otherwise or physically impossible or irrelevant.

Furthermore, while the specification focuses on embodiments disclosing a pixel cell comprising at least one further pixel cell terminal that is coupled to a further electrode to supply a direct voltage to the pixel cell, and a driver being configured to additionally charge the further electrode, to define a pixel cell intermediate condition; the intermediate condition limiting a possible cell display property change due to an applied basic voltage inducing a minimal electro mechanic force in the channel due to a changed wetting property, additional aspects of this disclosure are deemed to fall within the scope of the invention. Typically, while the direct voltage may be provided directly by the driver without intervening switching circuits provided on the cell, additional switching circuits may provide this direct voltage, even without the driver being configured to provide an intermediate condition as herein defined. Furthermore, the driver may be configured to provide a cell display property change by multiphased charging of the further electrode independent of the phases defining pluralities of intermediate conditions, for example, by switching a charge pump irrespective of an intermediate condition. Furthermore, the switching circuit may be provided by circuit elements each addressing a certain phase in the display property change. The circuit elements may for example comprise a 'to black' circuit; a 'to white' circuit and/or reset circuits. Furthermore, the switching circuit may comprise a switched charge pump configured to continuously charge one of the pixel cell terminals. Also, the driver may be configured to provide a cell display property change wherein the polar fluid front is stabilized at the position of a polar fluid front movement barrier.

Unless otherwise indicated or defined, the following reference list defines elements and aspects as disclosed herein:

1: display or display apparatus

2: pixel cell or pixelized electrofluidic cell

3: further electrode directly connected to the further pixel terminal 4 and charged by driver 5

4: further pixel cell terminal that is coupled to a further electrode 3 to supply a direct voltage to the pixel cell 2

5: driver being configured to charge the row and column electrodes 7, 8 and activate the switching circuit 9 to address a switched voltage to a pixel cell 2 via switched voltage terminal 10

6: circuit board comprising a plurality of switching circuits 9 for supplying a switched voltage to the pixel cells 2, a driver 5 and row and column electrodes 7, 8.

7: row electrode coupled to the switching circuit 9

8: column electrode coupled to the switching circuit 9

9: switching circuit comprising the active element connected to at least one pixel cell terminal, so as to vary the wetting property of the surface and connected to a row and column electrode.

10: switched voltage terminal of the pixel cell 2 being addressed by and connected to the switching circuit 9.

20: pixel cell

21: fluid holder: including fluid reservoir 22 and channel 23 that are connected

22: fluid reservoir with small visible area connected to the channel

23: channel with large visible area connected to the reservoir

24: polar fluid

25: large principal radius of curvature of the polar fluid 24 in the fluid reservoir 22

26: small principal radius of curvature of the polar fluid 24 in the channel 23

27: surface of the channel 23

Pixel: the combination of a switched circuit and a connected pixel cell of the display apparatus 1.

Pixel color: cell display property, also encompassing monochromatic variants

Supply voltage: the voltage difference applied to the at least 2 pixel cell terminals.

Basic supply voltage: the supply voltage difference applied over a channel surface part generating a minimum electromechanical force in the pixel cell in the intermediate condition.

Switched voltage: the voltage applied to the pixel cell 2 via the switched voltage terminal 10 by the switching circuit 9.

Direct voltage: the voltage supplied to the further electrode 3 that is coupled to the at least one further pixel cell terminal 4 of the pixel cell 2

Pixel cell terminals: at least two terminals arranged to supply a supply voltage over at least part of the surface of the channel 23 comprising the wetting property responsive to the applied supply voltage Cell display property: a certain transmissive or reflective optical state of the pixel cell 20

Transition error: the mismatch between the desired cell display property, e.g. color or grey tone, and the achieved cell display property at the end of a transition between the two cell display properties Intermediate condition: the state of the pixel cell wherein the possible cell display property changes are limited due to the supply of a basic supply voltage to the at least one further pixel cell terminal with the aim to reduce the switched voltage required to induce a change in the cell display property Multiphase cell display property change or the multiphase pixel color change: the total (cumulative) change of the cell display property from the start of the first phase until the end of the last phase in a multiphase driving method.

The detailed drawings, specific examples and particular formulations given serve the purpose of illustration only. Other substitutions, modifications, changes, and omissions may be made in the design, operating conditions, and arrangement of the exemplary embodiments without departing from the scope of the invention as expressed in the appended claims.

What is claimed is:

1. A display apparatus comprising:

a plurality of electrofluidic chromatophore (EFC) pixel cells, each pixel cell comprising:

i) a fluid holder for holding a polar fluid and a non-polar fluid having differing display properties, the fluid holder comprising:

(1) a fluid reservoir with a geometry having a small visible area onto the polar fluid, and (2) a channel with a geometry having a large visible area onto the polar fluid, the channel being connected to the reservoir so as to enable free movement of the polar fluid and non-polar fluid between the channel and the reservoir, at least part of a surface of the channel comprising a wetting property responsive to a supply voltage, and ii) at least two pixel cell terminals arranged to provide the supply voltage to the at least part of the surface of the channel comprising the wetting property;

a circuit board, the circuit board comprising:

i) a plurality of switching circuits for supplying a switched voltage to the pixel cells, the plurality of switching circuits each being connected to at least one of the pixel cell terminals, ii) a plurality of row and column electrodes, the row and column electrodes being pairwise coupled to the switching circuit, and iii) a driver configured to charge the row and column electrodes and activate the switching circuits to address the switched voltage to the pixel cell, so as to generate the supply voltage resulting in a movement of the polar fluid to change a cell display property;

wherein the pixel cell comprises at least one further pixel cell terminal that is coupled to a further electrode to supply a direct voltage to the pixel cell;

wherein the driver is further configured to additionally charge the further electrode, to define a pixel cell intermediate condition;

wherein the driver is configured to supply a direct voltage to the pixel cell that is dependent on the cell display property change; and wherein the driver is configured to provide the direct voltage, and a substantially minimal switched voltage, the direct voltage resulting in a basic supply voltage that minimizes an electromechanical force in the channel, and wherein the driver is configured to supply a switched voltage resulting in an increased electromechanical force that moves the polar fluid into the channel.

2. The display apparatus according to claim 1, wherein the driver is configured to provide a cell display property change by multiphased charging of the further electrode to define a plurality of intermediate conditions.

3. The display apparatus according to claim 1, wherein the basic supply voltages is arranged to stabilize the polar fluid in the channel.

4. The display apparatus according to claim 1, wherein the driver is configured to provide the direct voltage, in addition to supplying a stabilizing switched voltage, the combination of which results in a substantially non-zero supply voltage that stabilizes the polar fluid in the channel, and wherein the driver is configured to move the polar fluid out of the channel, when reducing the switched voltage.

5. The display apparatus according to claim 2, wherein the multiphased charging includes a phase wherein the driver is configured to provide the direct voltage, and a substantially minimal switched voltage, the direct voltage resulting in a basic supply voltage that stabilizes the polar fluid in the channel, and wherein the driver is configured to supply a switched voltage resulting in an electromechanical force that moves the polar fluid into the channel and a phase, wherein the driver is configured to provide the direct voltage, in addition to supplying a stabilizing switched voltage, the combination of which results in a substantially non-zero supply voltage that stabilizes the polar fluid in the channel, and wherein the driver is configured to move the polar fluid out of the channel, when reducing the switched voltage.

6. The display apparatus according to claim 1, wherein the at least two pixel cell terminals comprise a common electrode terminal, a switched voltage terminal and a direct voltage terminal; the common electrode terminal being coupled to a first channel electrode; the switched voltage terminal being coupled to the switching circuit; and the direct voltage terminal being coupled to a second row electrode.

7. The display apparatus according to claim 6, wherein the polar fluid is conductive, the switched voltage terminal is coupled to a contact electrode contacting the conductive polar fluid, and the direct voltage terminal is coupled to a second channel electrode.

8. The display apparatus according to claim 6, wherein the polar fluid is conductive, the switched voltage terminal is coupled to a second channel electrode, and the direct voltage terminal is coupled to a contact electrode contacting the conductive polar fluid.

9. The display apparatus according to claim 6, further comprising a storage capacitor, the storage capacitor being connected between the switched voltage terminal and the direct voltage terminal.

10. The display apparatus according to claim 1, wherein the switching circuit comprises at least one thin film transistor (TFT).

11. The display apparatus according to claim 1, wherein the driver is configured to provide driving signals that invert the polarity of the supply voltage over the pixel cell at regular time intervals, so as to obtain an average supply voltage that is essentially zero with no directional build-up of charges in the pixel cell.

12. The display apparatus according to claim 1, wherein the pixel cell further comprises polar fluid front movement barriers.

13. The display apparatus according to claim 12, wherein the driver is configured to stabilize the polar fluid front at a position of a polar fluid front movement barrier when changing the pixel cell intermediate condition.

14. The display apparatus according to claim 1, wherein the switching circuit comprises a switched charge pump configured to continuously charge one of the pixel cell terminals.

15. The display apparatus according to claim 1, wherein the switching circuit comprises a first circuit for supplying a switched voltage that moves the polar fluid out of the channel and a second circuit for supplying a switched voltage that moves the polar fluid into the channel.

16. The display apparatus according to claim 1, wherein the circuit board additionally comprises: a plurality of direct voltage circuits for supplying a direct voltage to the pixel cell, the direct voltage circuits being connected to at least one further pixel cell terminal; a plurality of electrodes coupled to the direct voltage circuit; and a driver configured to charge the plurality of electrodes and activate the direct voltage circuits to address the direct voltage to the pixel cell.

17. The display apparatus according to claim 1, wherein the surface channel wetting property is arranged to stabilize the polar fluid front in an absence of a supply voltage; and wherein a reservoir electrode is arranged to move the polar fluid out of the channel.

18. The display apparatus according to claim 17, wherein the switching circuit comprises a separate circuit for supplying: a switched voltage that moves the polar fluid into the channel, and a voltage to the reservoir electrode that moves the polar fluid out of the channel.

19. A display apparatus comprising:

a plurality of electrofluidic chromatophore (EFC) pixel cells, each pixel cell comprising:
- i) a fluid holder for holding a polar fluid and a non-polar fluid having differing display properties, the fluid holder comprising:
  - (1) a reservoir with a geometry having a small visible area projected in the direction of a viewer onto the polar fluid, and
  - (2) a channel with a geometry having a large visible area projected in the direction of a viewer onto the polar fluid, the channel being connected to the reservoir so as to enable free movement of the polar fluid and non-polar fluid between the channel and the reservoir, at least part of a surface of the channel comprising a wetting property responsive to a supply voltage over the pixel cell, and
- ii) at least two pixel cell terminals configured to provide the supply voltage to the at least part of the surface of the channel comprising the wetting property;

a circuit board, the circuit board comprising:
- i) switching circuits connected to a switched terminal of the pixel cell, for supplying a switched voltage to the pixel cells,
- ii) a row electrode connected to the switching circuit, and a column electrode connected to the switching circuit, and
- iii) a driver configured to provide drive signals charging the row and column electrodes to activate the switching circuit to address the switched voltage to the pixel cell;

wherein the pixel cell comprises at least one further pixel cell terminal that is coupled to a further electrode to supply a direct voltage to the pixel cell;

wherein the driver is further configured to additionally charge the further electrode, to define a pixel cell intermediate condition;

wherein the driver is configured to supply a direct voltage to the pixel cell that is dependent on the cell display property change; and wherein the driver is configured to provide the direct voltage, in addition to supplying a stabilizing switched voltage, the combination of which results in a substantially non-zero supply voltage that stabilizes the polar fluid in the channel, and wherein the driver is configured to move the polar fluid out of the channel, when reducing the switched voltage.

* * * * *